US012511835B2

(12) United States Patent
Abuelwafa et al.

(10) Patent No.: US 12,511,835 B2
(45) Date of Patent: Dec. 30, 2025

(54) METHOD AND SYSTEM FOR AUTOMATIC CHARACTERIZATION OF A THREE-DIMENSIONAL (3D) POINT CLOUD

(71) Applicant: APPLICATIONS MOBILES OVERVIEW INC., Montreal (CA)

(72) Inventors: Sherif Esmat Omar Abuelwafa, Montreal (CA); Laurent Juppe, Montreal (CA); Asma Iben Houriia, Montreal (CA); Annie-Pier Lavallee, Montreal (CA); Marie-Eve Desrochers, Montreal (CA); Bryan Martin, Montreal (CA)

(73) Assignee: APPLICATIONS MOBILES OVERVIEW INC., Montreal (CA)

( * ) Notice: Subject to any disclaimer, the term of this patent is extended or adjusted under 35 U.S.C. 154(b) by 0 days.

(21) Appl. No.: 18/406,473

(22) Filed: Jan. 8, 2024

(65) Prior Publication Data
US 2024/0296625 A1 Sep. 5, 2024

Related U.S. Application Data

(63) Continuation of application No. 17/974,157, filed on Oct. 26, 2022, now Pat. No. 11,908,081, which is a
(Continued)

(30) Foreign Application Priority Data

Dec. 24, 2020 (EP) .................................... 20217317

(51) Int. Cl.
*G06T 17/20* (2006.01)
*G06T 7/64* (2017.01)
*G06V 10/25* (2022.01)

(52) U.S. Cl.
CPC ................ *G06T 17/20* (2013.01); *G06T 7/64* (2017.01); *G06V 10/25* (2022.01); *G06T 2207/10028* (2013.01); *G06T 2207/20044* (2013.01)

(58) Field of Classification Search
CPC ......... G06T 7/55; G06T 15/205; G06T 17/05; G06T 17/00; G06T 7/10;
(Continued)

(56) References Cited

U.S. PATENT DOCUMENTS 10,702,216 B2  7/2020  Sareen et al.
11,132,833 B2  9/2021  Fedyukov et al.
(Continued)

FOREIGN PATENT DOCUMENTS

AU  2017260525 B2  11/2017
AU  2017260525 A1  11/2018
(Continued)

OTHER PUBLICATIONS

Tagliasacchi, A., Zhang, H. and Cohen-Or, D., 2009. Curve skeleton extraction from incomplete point cloud. In ACM SIGGRAPH 2009 papers (pp. 1-9).*
(Continued)

*Primary Examiner* — Phu K Nguyen
(74) *Attorney, Agent, or Firm* — BCF LLP

(57) ABSTRACT

Methods of and systems for characterization of a 3D point cloud are disclosed. The method comprises accessing a 3D point cloud, the 3D point cloud being a set of data points representative of the object, determining, based on the 3D point cloud, a 3D reconstructed object, determining, based on the 3D reconstructed object, a digital framework of the 3D point cloud, the digital framework being a ramified 3D tree structure, the digital framework being representative of a base structure of the object, morphing a 3D reference
(Continued)

model of the object onto the 3D reconstructed object, the morphing being based on the digital framework; and determining, based on the morphed 3D reference model and the 3D reconstructed object, characteristics of the object.

20 Claims, 30 Drawing Sheets

Related U.S. Application Data continuation of application No. PCT/IB2021/062129, filed on Dec. 21, 2021.

(58) Field of Classification Search
CPC ....... G06T 2207/10028; G06T 2210/56; G06T 18/00; G06V 20/647
USPC .......................................................... 345/418
See application file for complete search history.

(56) References Cited

U.S. PATENT DOCUMENTS

| | | | |
|---|---|---|---|
| 11,328,429 | B2 | 5/2022 | Liu et al. |
| 11,335,025 | B2 | 5/2022 | Chen |
| 11,341,723 | B2 | 5/2022 | Michielin et al. |
| 11,574,485 | B2 | 2/2023 | Jain et al. |
| 2014/0043329 | A1 | 2/2014 | Wang et al. |
| 2020/0160616 | A1 | 5/2020 | Li et al. |
| 2020/0242331 | A1 | 7/2020 | Song et al. |
| 2021/0145299 | A1* | 5/2021 | Robinson .............. A61B 5/1114 |
| 2022/0229943 | A1 | 7/2022 | Uy et al. |

FOREIGN PATENT DOCUMENTS

| | | |
|---|---|---|
| CN | 103258345 A | 8/2013 |
| WO | 2020/240497 A1 | 12/2020 |
| WO | 2022096943 A1 | 5/2022 |

OTHER PUBLICATIONS

Li Y, Ma L, Zhong Z, Liu F, Chapman MA, Cao D, Li J. Deep learning for lidar point clouds in autonomous driving: A review. IEEE Transactions on Neural Networks and Learning Systems. Aug. 21, 2020;32(8):3412-32.*

Xu T, An D, Jia Y, Yue Y. A Review: Point Cloud-Based 3D Human Joints Estimation. Sensors (Basel, Switzerland). Mar. 1, 2021;21(5):1684.*

Yan Z, Duckett T, Bellotto N. Online learning for 3D LiDAR-based human detection: experimental analysis of point cloud clustering and classification methods. Autonomous Robots. Jan. 2020;44(2):147-64.*

Kong L, Yuan X, Maharjan AM. A hybrid framework for automatic joint detection of human poses in depth frames. Pattern Recognition. May 1, 2018;77:216-25.*

International Search Report and Written Opinion with regard to the counterpart International Patent Application No. PCT/IB2021/062129 mailed Jun. 20, 2022.

Gardiner, et al., "Alpha shapes: determining 3D shape complexity across morphologically diverse structures", Gardiner et al. BMC Evolutionary Biology, Dec. 5, 2018, pp. 1-16.

English Abstract for CN103258345 retrieved on Espacenet on Jun. 22, 2022.

Teed et al., "Deep V2D: Video to Depth with Differentiable Structure from Motion", ICLR 2020, arXiv:1812.04605v4 [cs.CV] Apr. 27, 2020, pp. 1-20.

Extended European Search Report with regard to the counterpart EP Patent Application No. 20217317.5 completed Jun. 11, 2021.

Attene, et al., "Hierarchical mesh segmentation based on fitting primitives", The Visual Computer, International Journal of Computer Graphics, Springer, Berlin, DE, vol. 22, No. 3, Mar. 1, 2006 (Mar. 1, 2006), pp. 181-193.

Berger et al., "State of the Art in Surface Reconstruction from Point Clouds", EUROGRAPHICS star report, Apr. 1, 2014 (Apr. 1, 2014), pp. 161-185.

Kresslein et al., "Automated Cross-sectional Shape Recovery of 3D Branching Structures from Point Cloud", Journal of Computational Design and Engineering, vol. 5, No. 3, Nov. 16, 2017 (Nov. 16, 2017), pp. 368-378.

Au et al., "Skeleton Extraction by Mesh Contraction", Research Express, vol. 8, Issue 10, 2009, pp. 1-3.

Moon et al., "Camera Distance-aware Top-down Approach or 3D Multi-person Pose Estimation from a Single RGB Image", arXiv:1907.11346v2 [cs.CV] Aug. 17, 2019, 16 pages.

Luo, D. and Liao, L., Oct. 2010. Mining outliers from point cloud by data slice. In 2010 International Conference on Artificial Intelligence and Education (ICAIE) (pp. 663-666). IEEE.

Yan Z, Liu R, Cheng L, Zhou X, Ruan X, Xiao Y. A concave hull methodology for calculating the crown volume of individual trees based on vehicle-borne LiDAR data. Remote Sensing. Mar. 14, 2019;11(6):623.

* cited by examiner

METHOD AND SYSTEM FOR AUTOMATIC CHARACTERIZATION OF A THREE-DIMENSIONAL (3D) POINT CLOUD

CROSS-REFERENCE

This application is a continuation of U.S. Patent Application Ser. No. 17/974,157, filed on Oct. 26, 2022, which is a continuation of International Patent Application No. PCT/IB2021/062129, filed on Dec. 21, 2021, which claims priority from European Patent Application No. 20217317.5, filed on Dec. 24, 2020, an entirety of contents of each of which is incorporated herein by reference.

FIELD

The present technology relates to systems and methods for characterization using three-dimensional (3D) point cloud. In particular, a system and methods for automatic measurement on 3D point cloud irregular volumes are disclosed.

BACKGROUND

Three-dimensional (3D) point clouds have broad applications in 3D modeling, automatic driving, object characterization, and other areas. 3D point clouds are sets of data points, each data points being defined by a position (e.g, a set of cartesian coordinates) in a space such that the 3DPC represents a 3D shape or an object. In one example, 3D laser scanners generate 3D digital data. A long range laser scanner is fixed in one location and rotated to scan objects around it. Alternatively, a short-range laser scanner is mounted on a device that moves around an object while scanning it. In any of the scenarios, the location of each point scanned is represented as a polar coordinate since the angle between the scanner and the object and distance from the scanner to the object are known. The polar coordinates are then converted to 3D Cartesian coordinates and stored along with a corresponding intensity or color value for the data point collected by the scanner.

Other examples to generate 3D digital data are depth cameras or 3D scanner to generate 3D digital data by collecting a complete point set of (x, y, z) locations that represent the shape of an object. Once collected, these point sets, also known as 3D point clouds, are sent to an image rendering system, which then processes the point data to generate a 3D representation of the object.

However, performing geometrical measurements and characterization of the 3D point cloud based on the data points thereof may be unprecise and cumbersome tasks due to a lack of information about the 3D point cloud. Indeed, relying on the positions of the data points may lead to inaccurate measurements. Moreover, typical systems and method to capture 3D point cloud and then generate 3D representation of the object require specialized, inconvenient and costly hardware equipment. To this end, there is an interest in developing efficient and cost-effective 3D point cloud characterization systems and methods.

SUMMARY

In a first aspect, various implementations of the present technology provide a computer-implemented method for determining characteristics of an object, the method comprising: accessing a 3D point cloud, the 3D point cloud being a set of data points representative of the object, determining, based on the 3D point cloud, a 3D reconstructed object, determining, based on the 3D reconstructed object, a digital framework of the 3D point cloud, the digital framework being a ramified 3D tree structure, the digital framework being representative of a base structure of the object, morphing a 3D reference model of the object onto the 3D reconstructed object, the morphing being based on the digital framework and determining, based on the morphed 3D reference model and the 3D reconstructed object, characteristics of the object.

In a second aspect, various implementations of the present technology provide a computer-implemented method for determining a digital framework of an object, the digital framework comprising digital joints defining points at which portions of the object move relative to each other. The method comprises accessing a 3D point cloud, the 3D point cloud being a set of data points representative of the object, determining, based on a machine learning algorithm, a first framework of the 3D point cloud, the first framework being a first ramified 3D tree structure and defining a first base structure of the object, the first framework comprising a first set of joints, meshing the 3D point cloud, thereby generating a meshed surface, determining, based on the meshed surface, a second framework of the 3D point cloud, the second framework defining a second base structure of the object, the second framework comprising a second set of joints and aligning the first framework onto the second framework to generate the digital framework.

In a third aspect, various implementations of the present technology provide a computer-implemented method for determining joints of an object, the joints defining points at which portions of the object move relative to each other. The method comprises accessing a 3D point cloud, the 3D point cloud being a set of data points representative of the object, determining a digital framework of the 3D point cloud, the digital framework being a ramified 3D tree structure defining a base structure of the object, identifying local radiuses of curvature of the digital framework and determining presence of joints based on a comparison of the local radiuses of curvature with a threshold.

In a fourth aspect, various implementations of the present technology provide a computer-implemented method for determining joints of an object, the method comprising accessing a 3D point cloud, the 3D point cloud being a set of data points representative of the object, determining a digital framework of the 3D point cloud, the digital framework being a ramified 3D tree structure, and determining presence of joints of the object on the digital framework based on ramifications of the digital framework. Determining presence of joints comprises generating a plurality of feature points on the digital framework, determining a number of neighboring feature points for each feature points and identifying one or more feature points as joints in response to determining that the one or more features points have more than two neighboring feature points.

In a fifth aspect, various implementations of the present technology provide a computer-implemented method for determining joints of an object, the method comprising accessing a 3D point cloud, the 3D point cloud being a set of data points representative of the object, generating, according to a set of parameters, at least one 2D virtual image of the 3D point cloud, executing a machine learning algorithm on the at least one 2D virtual image, the machine learning algorithm outputting 2D projected joints of the object on the at least one 2D virtual image and projecting, based on the set of parameters, the 2D projected joints onto the 3D point cloud thereby defining 3D projected joints.

In a sixth aspect, various implementations of the present technology provide a computer-implemented method for assessing a quality of a 3D point cloud, the method comprising accessing the 3D point cloud, the 3D point cloud being a set of data points representative of the object, and determining a first quality parameter. Determination of the first quality parameter comprising determining local densities of the 3D point cloud, determining, based on the local densities, a highest local density and a lowest local density of the 3D point cloud, determining, based on a density of the highest density area and a density of the lowest density area, a threshold density, and identifying one or more low-density areas in the 3D point cloud that have a density lower than the threshold density, the first quality parameter being defined by a ratio of a surface of the one or more low-density areas on a surface of the 3D point cloud. The method further comprises determining a second quality parameter, a determination of the second quality parameter comprising slicing the 3D point cloud into a plurality of slices, generating, based on variations of characteristics of the slices, local quality parameters of the 3D point cloud, and identifying one or more poor-quality areas in the 3D point cloud that have a local quality parameter lower than a pre-determined threshold, the second quality parameter being defined by an average of local quality parameters. The method further comprises determining a quality factor based on the first quality parameter and the second quality parameter.

In a seventh aspect, various implementations of the present technology provide a computer-implemented method for assessing a quality of a 3D point cloud, the method comprising accessing the 3D point cloud, the 3D point cloud being a set of data points representative of the object, determining local densities of the 3D point cloud, determining. based on the local densities, a highest local density and a lowest local density of the 3D point cloud, determining a threshold density based on the highest density area and the lowest density area, identifying one or more low-density areas in the 3D point cloud that have a density lower than the threshold density and determining a quality factor of the 3D point cloud based on the identified one or more low-density areas.

In an eighth aspect, various implementations of the present technology provide a computer-implemented method for assessing a quality of a 3D point cloud, the method comprising slicing the 3D point cloud into a plurality of slices and generating, based on variations of characteristics of the slices, a local quality parameter of the 3D point cloud.

In a nineth aspect, a method for characterization of a 3D point cloud, the 3D point cloud being a representation of an object to be characterized, the method comprising: executing denoising routines on the 3D point cloud: meshing the 3D point cloud to generate a surface: determining an average orientation of the 3D point cloud: slicing the 3D point cloud along the orientation of the 3D point cloud; and determining characteristics of the 3D point cloud based on the slices.

In a tenth aspect, various implementations of the present technology provide A computer-implemented method for determining characteristics of an object, the method comprising accessing a 3D point cloud, the 3D point cloud being a set of data points representative of the object, slicing the 3D data point cloud into a plurality of slices, determining, for the given slice, a first spline curve and a second spline curve, determining, for the given slice, a third spline curve based on the first and second spline curves and determining geometrical local characteristics of the object based on the third spline curve.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
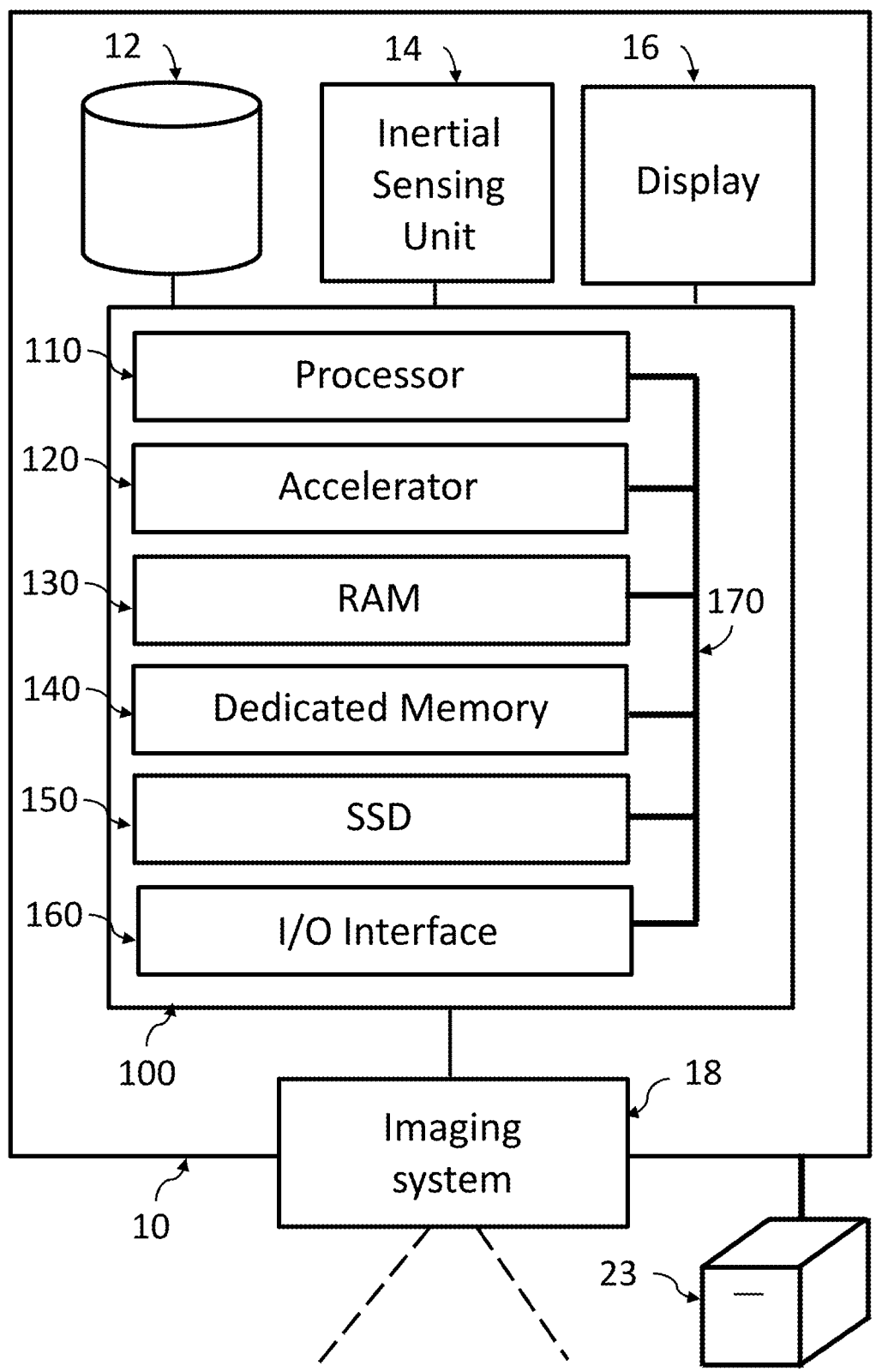
FIG. 1 is a schematic representation of a device configured for characterizing a three-dimensional (3D) point cloud in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams. state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In a broad aspect, the present technology provides a method for characterization of a 3D point cloud comprising a plurality of data points, the 3D point cloud being a representation of an object to be characterized. The object may be a rigid object or a non-rigid object. In the context of the present disclosure, a non-rigid object is a, object that have at least one joint. Said joint may allow, for example, rotation of one portion of the object with respect to another portion thereof. In other words, a non-rigid object is an assembly of rigid parts connected together by joints, or "articulations", offering up to three degrees of freedom in rotation. A rigid object is an object that does not comprise any joint.

In the context of the present disclosure, an object may be an organic element, such as a human body or a portion thereof, or an inorganic object such as a mechanical object (e.g., a control arm). The object to be characterized may also be a virtual object.

It is contemplated that the 3D point cloud may be generated by a device and further processed according to the teachings of the present disclosure. A device suitable for generating the 3D point cloud is described in greater details here after.

In one embodiment, the method comprises determining a digital framework of the 3D point cloud. The framework of an organic object may also be referred to as a "skeleton" of the object. Moreover, if determination is made that the skeleton of an object comprises one or more joints, the skeleton may be referred to as a "poly-skeleton". In a plurality of aspects of the present technology, the framework of the object is determined under the form of a ramified 3D tree structure. In the context of the present disclosure and to ease a reading thereof, a "framework" of a 3D point cloud or a 3D reconstructed object representing a physical object is equivalent to a "digital framework" thereof and is a virtual representation of a framework of a physical object. Similarly, a digital joint refers to a digital representation of a joint of the object to be characterized. To ease a reading of the present disclosure, a digital joint may be simple referred to as a "joint".

As such, the ramified 3D tree structure defines a base structure of the object. A ramified 3D tree structure may or may not comprise ramifications. An internal volume of the ramified 3D tree structure is zero or at least below a pre-determined threshold. Methods for determining the framework are described in greater details further below.

After determination of the framework, the 3D point cloud may be referred to as a 3D reconstructed object.

In one or more embodiment, the method may comprise morphing a 3D reference model onto the 3D reconstructed object to define one or more areas of interest. The morphing may be based on information about the framework of the 3D point cloud. The 3D reference model may comprise landmarks that, upon morphing the 3D reference model onto the 3D reconstructed object, gives indication of areas of interest to perform measurements on the 3D reconstructed object. Another aspect of the present technology is a method for determining and/or refining areas of interest. The present disclosure also provides a method to perform measurement and characterization of the points cloud in the areas of interest.

In one or more embodiments, the method comprises slicing the 3D point cloud. In the context of the present disclosure, a slice is a set of data points comprised in a same finite plane intersecting the 3D point cloud. A slice typically comprises data points that are relatively close to each other. A slice may comprise outlier data points that may be discarded from the slice according to known techniques. As an example, a given finite plane may intersect the 3D point cloud in a plurality of areas of the 3D point cloud, thereby forming a plurality of groups of data points, the data of each group being relatively close to each other. In the context of the present disclosure, a slice may refer to only one of the group of data points.

With these fundamentals in place, we will now consider some non-limiting examples to illustrate various implementations of aspects of the present technology.

With reference to FIG. 1, there is shown a device 10 suitable for use in accordance with at least some embodiments of the present technology. It is to be expressly understood that the device 10 as depicted is merely an illustrative implementation of the present technology. In some cases, what are believed to be helpful examples of modifications to the device 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the device 10 may provide in certain instances simple implementations of the present technology, and that where such is the case they have been presented in this manner as an aid to understanding. As persons skilled in the art would understand, various implementations of the present technology may be of a greater complexity.

FIG. 1 is a schematic representation of a device 10 configured for characterizing a three-dimensional (3D) point cloud in accordance with an embodiment of the present technology. The device 10 comprises a computing unit 100 that may receive captured images of an object to be characterized. The computing unit 100 may be configured to generate the 3D point cloud as a representation of the object to be characterized. The computing unit 100 is described in greater details hereinbelow:

In some embodiments, the computing unit 100 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 100 comprises various hardware components including one or more single or multi-core processors collectively represented by a processor 110, a solid-state drive 150, a RAM 130, a dedicated memory 140 and an input/output interface 160. The computing unit 100 may be a computer specifically designed to operate a machine learning algorithm (MLA) and/or deep learning algorithms (DLA). The computing unit 100 may be a generic computer system.

In some other embodiments, the computing unit 100 may be an "off the shelf" generic computer system. In some embodiments, the computing unit 100 may also be distributed amongst multiple systems. The computing unit 100 may also be specifically dedicated to the implementation of the present technology. As a person in the art of the present technology may appreciate, multiple variations as to how the computing unit 100 is implemented may be envisioned without departing from the scope of the present technology.

Communication between the various components of the computing unit 100 may be enabled by one or more internal and/or external buses 170 (e.g, a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the RAM 130 and executed by the processor 110. Although illustrated as a solid-state drive 150, any type of memory may be used in place of the solid-state drive 150, such as a hard disk, optical disk, and/or removable storage media.

The processor 110 may be a general-purpose processor, such as a central processing unit (CPU) or a processor dedicated to a specific purpose, such as a digital signal processor (DSP). In some embodiments, the processor 110 may also rely on an accelerator 120 dedicated to certain given tasks, such as executing the methods set forth in the paragraphs below. In some embodiments, the processor 110 or the accelerator 120 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

The device 10 comprises an imaging system 18 that may be configured to capture Red-Green-Blue (RGB) images. The imaging system 18 may comprise image sensors such as, but not limited to, Charge-Coupled Device (CCD) or Complementary Metal Oxide Semiconductor (CMOS) sensors and/or digital camera. Imaging system 18 may convert an optical image into an electronic or digital image and may send captured images to the computing unit 100. In the same or other embodiments, the imaging system 18 may be a single-lens camera providing RGB pictures. In some embodiment, the device 10 comprises depth sensors to acquire RGB-Depth (RGBD) pictures. Broadly speaking, any device suitable to generate a 3D point cloud may be used as the imaging system 18 including but not limited to depth sensors, 3D scanners or any suitable device.

The device 10 may comprise an Inertial Sensing Unit (ISU) 14 configured to be used in part by the computing unit 100 to determine a pose of the imaging system 18 and/or the device 10. Therefore, the computing unit 100 may determine a set of coordinates describing the location of the imaging system 18, and thereby the location of the device 10, in a coordinate system based on the output of the ISU 14. Generation of the coordinate system is described hereinafter. The ISU 14 may comprise 3-axis accelerometer(s), 3-axis gyroscope(s), and/or magnetometer(s) and may provide velocity, orientation, and/or other position related information to the computing unit 100.

The ISU 14 may output measured information in synchronization with the capture of each image by the imaging system 18. The ISU 14 may be used to determine the set of coordinates describing the location of the device 10 for each captured image of a continuous stream of images. Therefore, each image may be associated with a set of coordinates of the device 10 corresponding to a location of the device 10 when the corresponding image was captured. Furthermore, information provided by the ISU may be used to determine a coordinate system and/or a scale corresponding of the object to be characterized. Other approaches may be used to determine said scale, for instance by including a reference object whose size is known in the captured images, near the object to be characterized.

Further, the device 10 may include a screen or display 16 capable of rendering color images, including 3D images. In some embodiments, the display 16 may be used to display live images captured by the imaging system 18, 3D point clouds, Augmented Reality (AR) images. Graphical User Interfaces (GUIs), program output, etc. In some embodiments, display 16 may comprise and/or be housed with a touchscreen to permit users to input data via some combination of virtual keyboards, icons, menus, or other Graphical User Interfaces (GUIs). In Some embodiments, display 16 may be implemented using a Liquid Crystal Display (LCD) display or a Light Emitting Diode (LED) display, such as an Organic LED (OLED) display. In other embodiments, display 16 may remotely communicably connected to the device 10 via a wired or a wireless connection (not shown), so that outputs of the computing unit 100 may be displayed at a location different from the location of the device 10. In this situation, the display 16 which may be operationally coupled to, but housed separately from, other functional units and systems in device 10. The device 10 may be, for example, an iPhone'R from Apple or a GalaxyR from Samsung, or any other mobile device whose features are similar or equivalent to the aforementioned features. The device may be, for example and without being limitative, a handheld computer, a personal digital assistant, a cellular phone, a network device, a camera, a smart phone, an enhanced general packet radio service (EGPRS) mobile phone, a network base station, a media player, a navigation device, an e-mail device, a game console, or a combination of two or more of these data processing devices or other data processing devices.

The device 10 may comprise a memory 12 communicably connected to the computing unit 100 and configured to store without limitation data, captured images, depth values, sets of coordinates of the device 10, 3D point clouds, and raw data provided by ISU 14 and/or the imaging system 18. The memory 12 may be embedded in the device 10 as in the illustrated embodiment of FIG. 2 or located in an external physical location. The computing unit 100 may be configured to access a content of the memory 12 via a network (not shown) such as a Local Area Network (LAN) and/or a wireless connexion such as a Wireless Local Area Network (WLAN).

The device 10 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

As such, in at least some embodiments, the device 10 may also be suitable for generating the 3D point cloud, based on images of the object. Said images may have been captured by the imaging system 18. As an example, the device 10 may generate the 3D point cloud according to the teachings of the Patent Cooperation Treaty Patent Publication No. 2020/240497.

Summarily, it is contemplated that the device 10 may perform the operations and steps of method described in the present disclosure. More specifically, the device 10 may be suitable for capturing images of the object to be characterized, generating a 3D point cloud comprising data points and representative of the object, and executing methods for characterization of the 3D point cloud. In at least some embodiments, the device 10 is communicably connected (e.g. via any wired or wireless communication link including, for example, 4G, LTE, Wi-Fi, or any other suitable connection) to an external computing device 23 (e.g, a server) adapted to perform some or all of the methods for characterization of the 3D point cloud. As such operation of the computing unit 100 may be shared with the external computing device 23.

In this embodiment, the device 10 access the 3D point cloud by retrieving information about the data points of the 3D point cloud from the RAM 130. In some other embodiments, the device 10 access a 3D point cloud by receiving information about the data points of the 3D point cloud from the external computing device 23.

Figure 2:
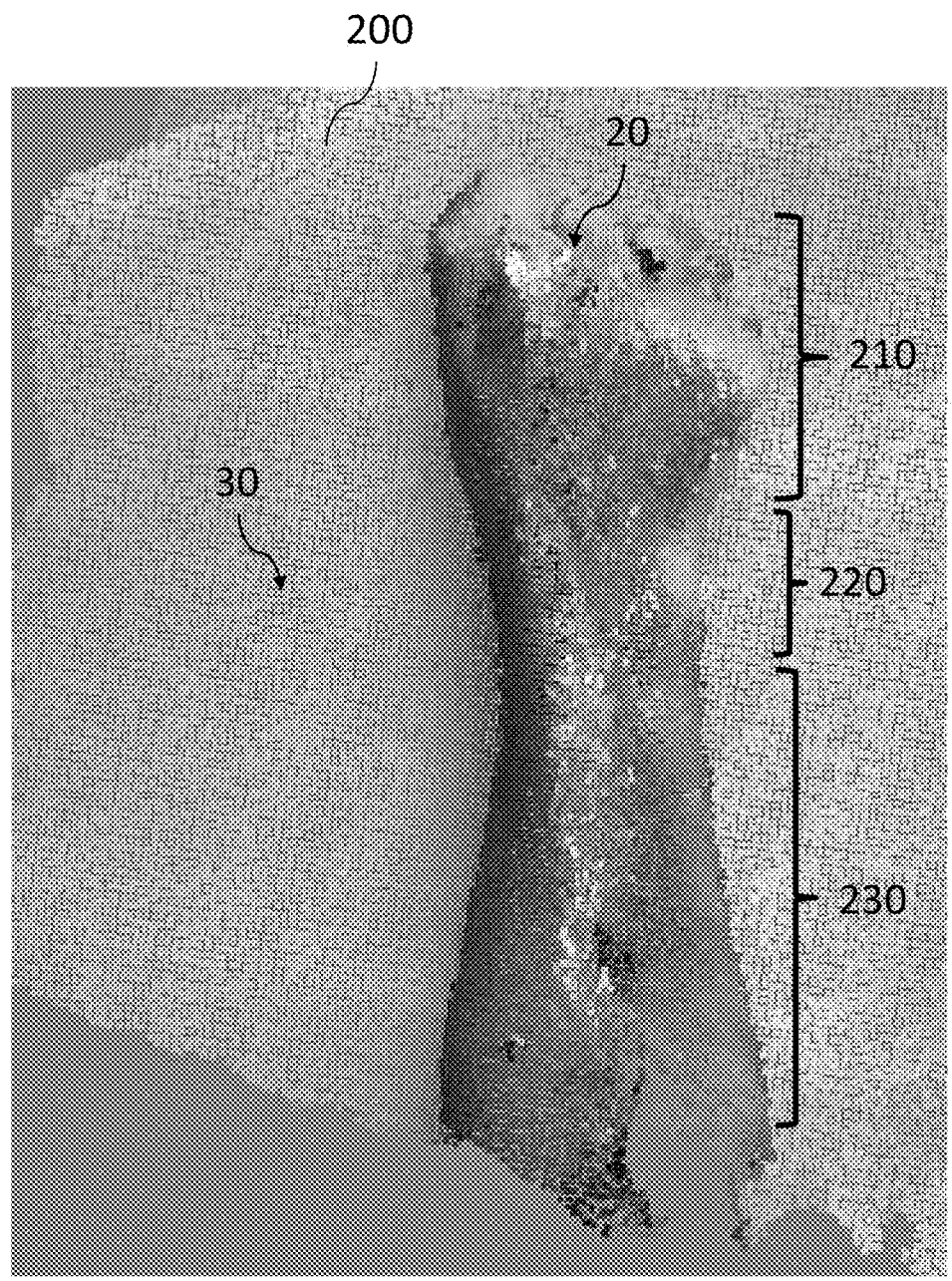
FIG. 2 is a 3D point cloud in accordance with an embodiment of the present technology.

FIG. 2 illustrates an illustrative 3D point cloud 200 in accordance with at least some embodiments of the present technology. The 3D point cloud 200 may comprise a plurality of data points 20 representing an outer shape or a median shape of an object. In the illustrative example of FIG. 2, the 3D point cloud 200 comprises a hand portion 210, a wrist portion 220 and a forearm portion 230. The 3D point cloud may be stored in a memory of the computer system 100, such as the RAM 130. More precisely, the memory may store 3D coordinates of each data point 20 with respect to a coordinate system. The 3D coordinates of a data point 20 may represent a position of the point in the coordinate system and/or relative to another data point 20.

The 3D point cloud may comprise a plurality of background data points 30 representing a background of a scene and/or a background of the object. The background data points 30 may be removed from the 3D point cloud and/or discarded from the memory using known denoising techniques such as, without limitation, marching cubes, Statistical Outlier Removal, Radius Outlier Removal, etc. Additionally or alternatively, the 3D point cloud may be denoised by, without limitation, color based denoising in various color spaces (RGB, Hue-Saturation-Lightness (HSL), Hue-Saturation-Value (HSV), etc.).

Figure 3:
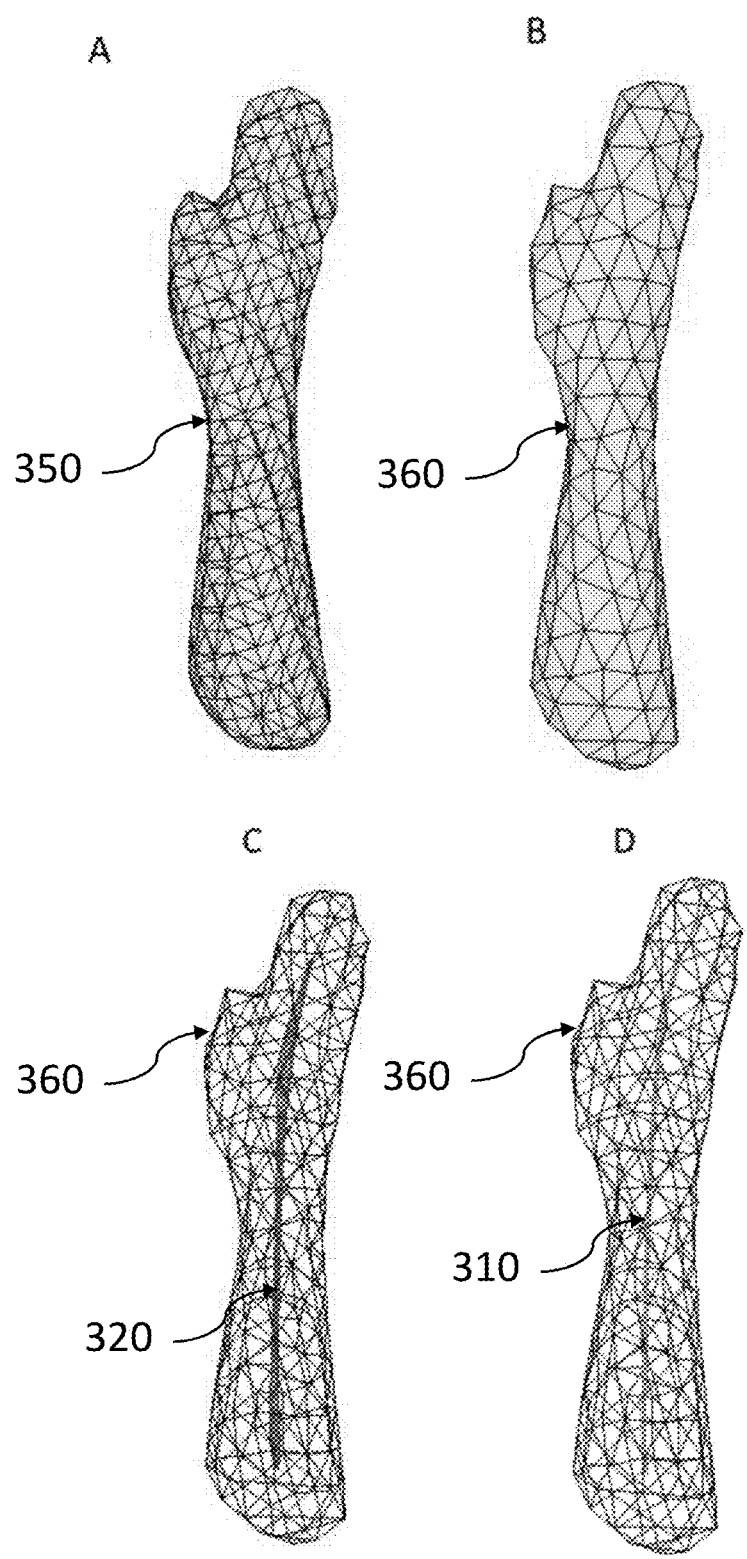
FIG. 3 illustrates meshed structures for generating an average line of the 3D point cloud in accordance with an embodiment of the present technology

FIG. 3 illustrates meshed structures for generating an average line of the 3D point cloud in accordance with an embodiment of the present technology. In the context of the present disclosure, the term "average line", "ramified 3D tree structure", "skeleton" and "framework" are equivalent. FIG. 3 and following figures relate to an illustrative use of the present technology applied for wrist characterization and, more precisely, wrist width and/or size of a wrist measurement. However, this application is a mere example of a possible use of the present technology and is not intended to define the scope or set forth the bounds of the present technology. The illustrative use disclosed hereinbelow may find applications in hand gesture recognition, characterization of other parts of a human body such as finger width measurement, etc.

A surface 350 representing a median shape of the object and/or approximating an outer shape of the object may be generated by the computer system 100, as depicted on FIG. 3A. The computer system 100 may execute known meshing techniques such as Dirichlet triangulation meshing. Delaunay triangulation meshing, or any other suitable techniques for generating the surface 350. The surface 350 is a meshed surface and may be further remeshed into a second meshed surface 360 to obtain a less ramified average line, as depicted on FIG. 3B. The second meshed surface may comprise a lower number of points 20 of the 3D point cloud 200. An average line 310, illustrated on FIG. 3D, may be generated based on iterations of contraction of the second meshed surface 360. Iteration may be performed until a single line is obtained, as the average line 310. In the context of the present disclosure, the terms "mesh", meshed surface", meshed structure" are equivalent.

Figure 4:
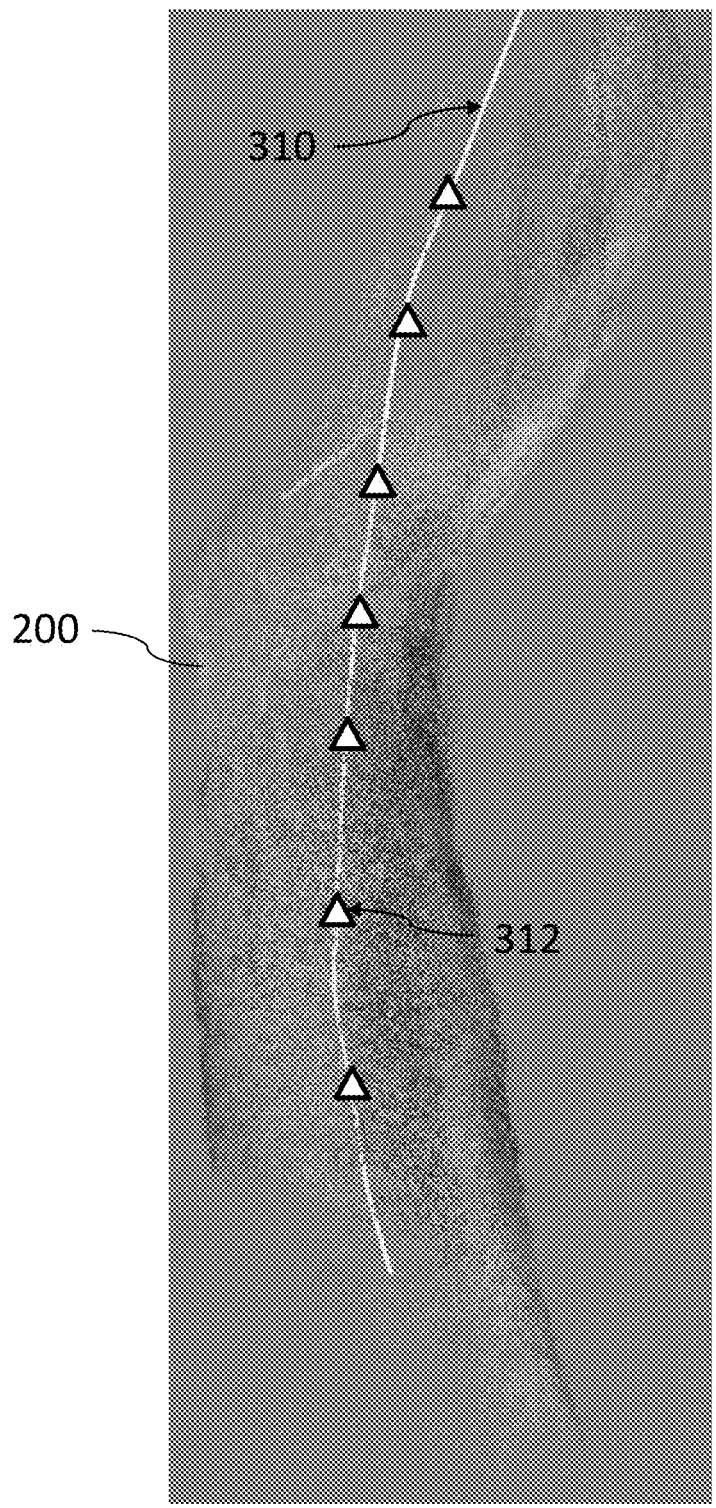
FIG. 4 is a 3D point cloud processed in accordance with an embodiment of the present technology.

More precisely, at each iteration, a meshed structure, such as meshed structure 320) depicted on FIG. 3C, is generated based on a contraction of a meshed structure generated at a prior iteration, starting from the second meshed surface 360. Contraction of meshed structure may be performed by skeleton-extraction techniques that may be know to the skilled person. Such mesh-contraction techniques may comprise performing unified down-sampling on the meshed structure. For instance and without limitation, the surface 350 may be iteratively smoothed and contracted into an approximate zero-volume degenerate mesh to generate the average line 310 that abstracts the outer shape of the object. The average line 310 may be considered as a one dimensional (1D) meshed structure. In the same of another embodiment, the mesh contraction is iteratively performed until an internal volume of the meshed structure is below a pre-determined threshold. Said pre-determined threshold may depend inter alia on a measured size of the object (i.e, a maximal distance between any two data points of the 3D point cloud). The average line 310 may comprise one or more ramifications, a ramification being defined by a division of the average line 310 in a plurality of branches (i.e, a plurality of directions). In one embodiment, a plurality of homogeneously spread framework points may be generated on the average line 310. As best shown on FIG. 4, a plurality of framework points 312 may have been generated on the average line 310. One or more framework points may be added to the average line 310 at predetermined intervals, subsequent to the generation of the average line 310.

Once the average line 310 is generated, an interpolation on the average line 310 may be performed to have an estimation of a position of the skeleton within the object to be characterized. The term "skeleton" may refer to an orientation of the 3D point cloud 200 and/or a skeleton of the object to be characterized. Even though the present examples are oriented toward a human arm, the present technology may be used to characterize human body parts as well as other objects such as mechanical parts, tires, industrial parts and/or any object that may be asymmetrical.

Figure 5:
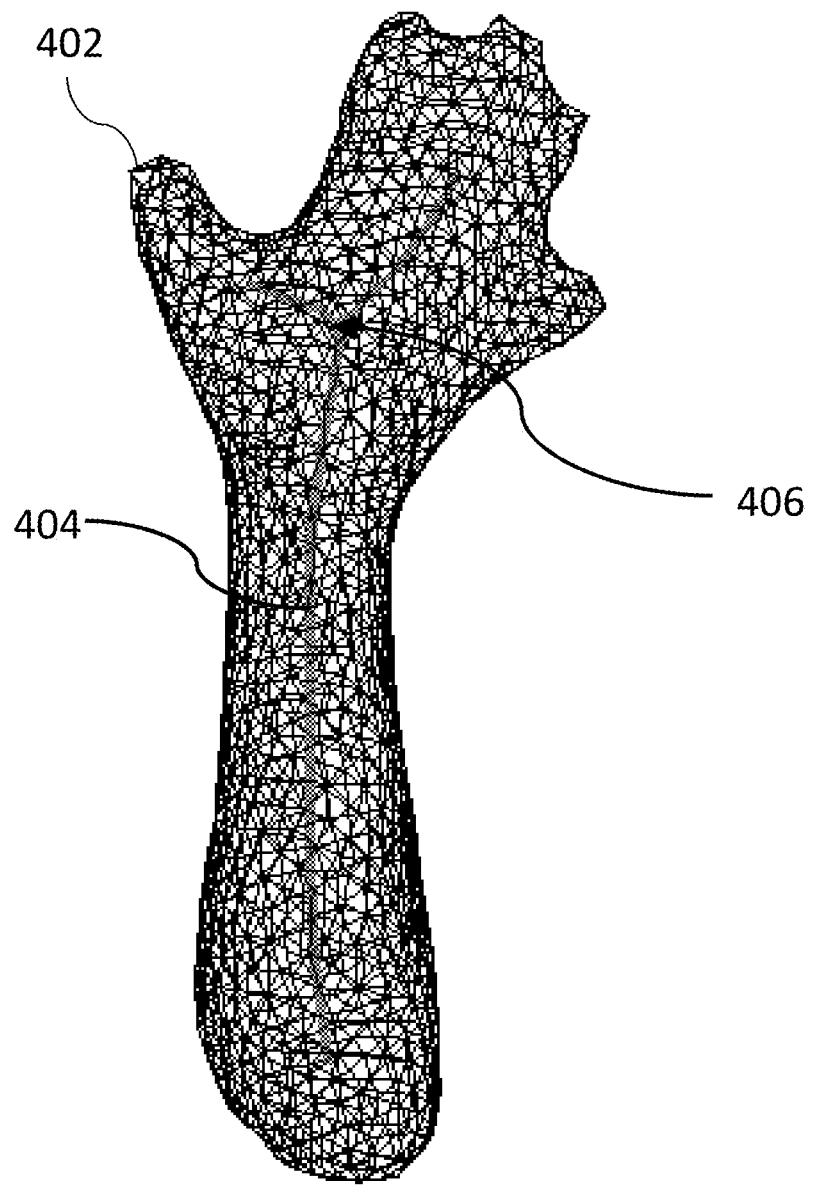
FIG. 5 is a representation of a meshed structure formed from a 3D point cloud and a framework thereof in accordance with an embodiment of the present technology.

An example of a framework 404 determined based on a meshed surface 402 is illustrated on FIG. 5. The framework 404 may be for example and without limitation, determined based on a mesh contraction routine performed according to the teachings of Skeleton extraction by mesh contraction (ACM SIGGRAPH 2008) by Oscar Kin-Chung Au et al. In this example, the framework 404 comprises a ramification 406.

Figure 6:
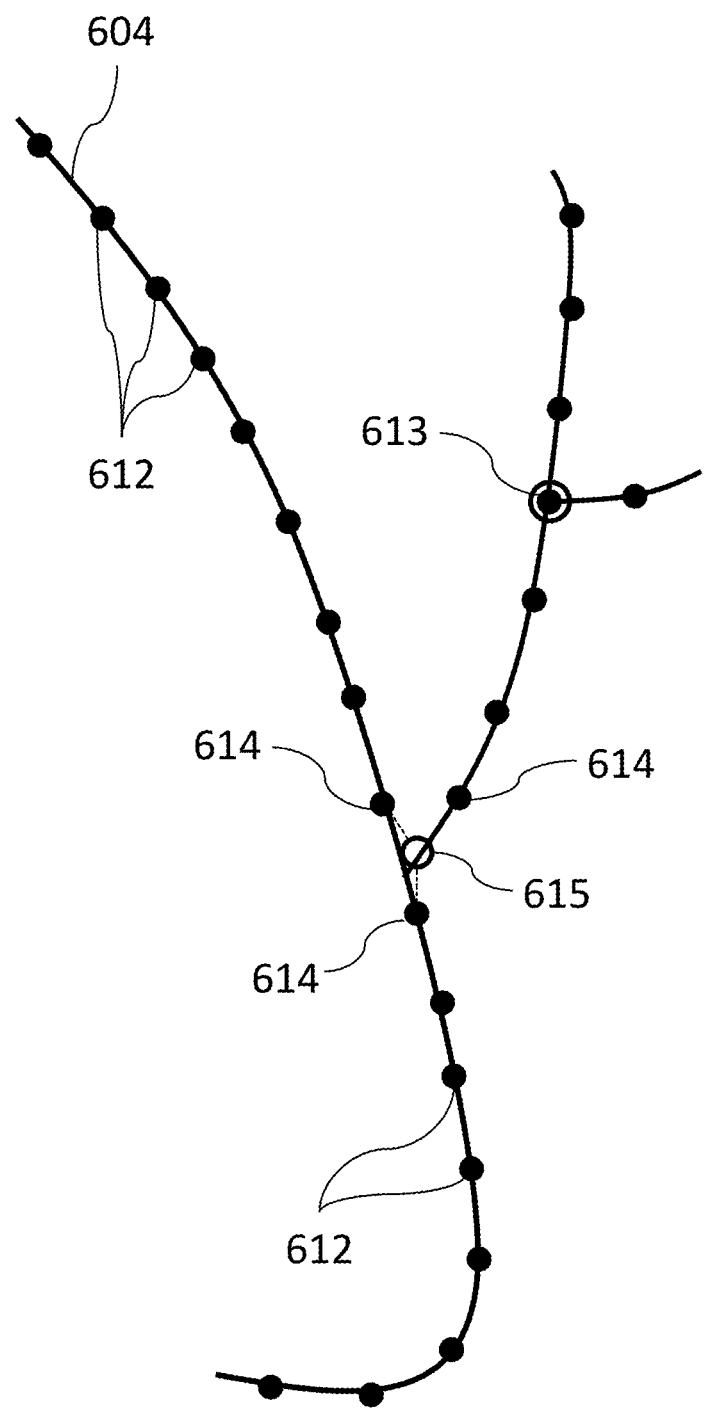
FIG. 6 illustrates a schematic framework in accordance with an embodiment of the present technology.

In one aspect, the present disclosure provides a method for determining joints of the object to be characterized. In this embodiment, the ramifications are identified based on a number of neighboring feature points of each framework points 312 that have been generated on the framework 404 as previously described (see FIG. 4). FIG. 6 illustrates a framework 604 comprising a plurality of framework points 612. In this embodiment, a number of neighboring framework points 612 is determined for each of the feature points 612. If determination is made that a given framework point 612 has more than two direct neighboring framework points 612 along the framework 604, the given framework point 612 is identified as a ramification of the framework 604. As an example, the framework point 613 has three direct neighboring framework points 612 and is thus identified as a ramification of the framework 604.

Moreover, in this embodiment, if determination is made that each one of a plurality of neighboring framework points 612 has more than two neighboring framework points 612, an average feature point is generated, a position of the newly generated average feature point being an a barycenter of the positions of the plurality of neighboring framework points 612. As an example, in FIG. 6, three neighboring framework points 614 have more than two direct neighboring framework points 612 along the framework 604. As such, an average framework point 615 is generated based on the three neighboring framework points 614. The average framework point 615 is further identified as a ramification of the framework 604.

As such a first set of joints of the 3D point cloud may be determined, each joint corresponding to a ramification.

Figure 7:
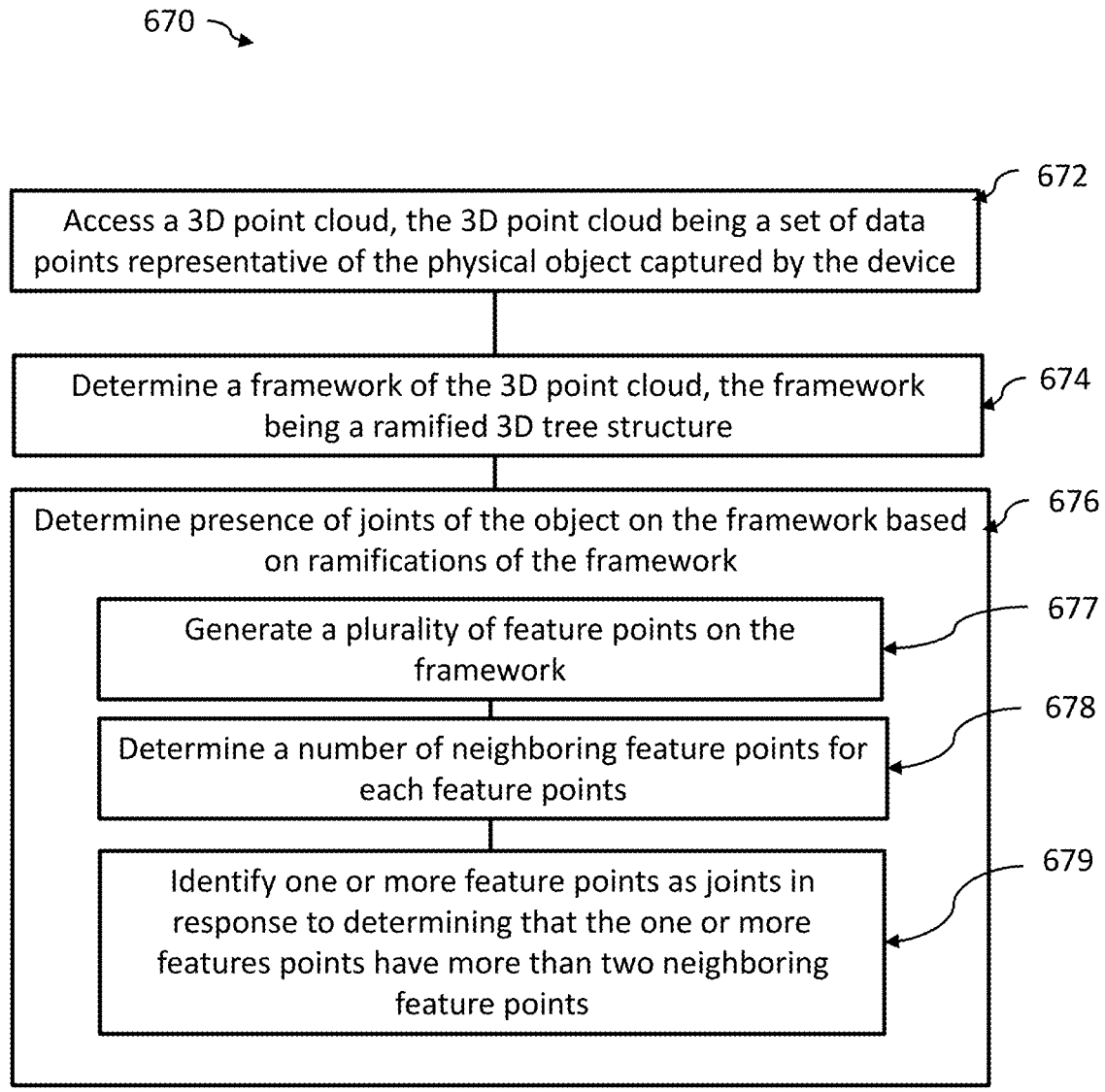
FIG. 7 illustrates a flow diagram showing operations of a method for determining joints of a 3D point cloud in accordance with an embodiment of the present technology

FIG. 7 is a flow diagram of a method 670 for determining joints of a object by a device, the joints defining points at which portions of the object move relative to each other, according to some embodiments of the present technology. In one or more aspects, the method 670 or one or more steps thereof may be performed by a computer system, such as the computer system 100. The method 670 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 670 comprises accessing, at step 672, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 670 also comprises determining, at step 674, a framework of the 3D point cloud, the framework being a ramified 3D tree structure defining a base structure of the object. As previously described, the ramified 3D tree structure may be determined using the aforementioned mesh contraction routine.

The method 670 also comprises determining, at step 676, presence of joints of the object on the framework based on ramifications of the framework. To do so, the method 670 comprises, at sub-step 677, generating a plurality of feature points on the framework. It can be said that the framework is sampled such that the feature points are evenly distributed along the framework. The method further comprises determining, at sub-step 678, a number of neighboring feature points for each feature points, and identifying, at sub-step 679, one or more feature points as joints in response to determining that the one or more features points have more than two neighboring feature points.

In the same of another embodiment, a second set of joints may be determined based on curvature of the framework 604. Indeed, the framework 604 is a ramified 3D tree structure, such that a curvature may be determined at each point of the framework 604. In this embodiment and with reference to FIG. 8, a radius of curvature Re is determined at each framework points 612, the radiuses of curvature of the framework points 612 being represented under the form of normal vectors 7010 having a norm proportional to 1/Rc. The framework 604 is partitioned into a plurality of portions, each portion comprises a plurality of framework points 612. For each portion, if determination is made that at least one of the framework points 612 corresponds to a radius of curvature that is below a pre-determined threshold, a framework point 612 of the portion having the lowest radius of curvature is identified as a joint of the 3D point cloud. As such, a given portion of the framework 604 may comprise at most one joint.

In this embodiment, said pre-determined threshold may be based on characteristics of the 3D point cloud. For example and without limitation, the pre-determined threshold may be equal to one percent of a maximal distance between any pair of data points of the 3D point cloud. In the illustrative embodiment described above, the curvature of the framework 604 is determined at each the framework points 612. The curvature may be determined at different points of the framework in alternative embodiments of the present technology.

As such, the second set of joints of the 3D point cloud may be determined based on radiuses of curvature of the framework 604. In some cases, a joint of the first set and a joint of the second set may overlap, namely have a relative distance between one another below a pre-determined threshold. If determination that two joints overlap, one of the two joints may be arbitrarily discarded. In some embodiments, the joint of the first set is discarded. In some other embodiments, the joint of the second set is discarded. In some yet other embodiments, an average joint is determined based on the two overlapping joints, a position of the average joint being a barycenter of the positions of the two overlapping joints, the two overlapping joints being further discarded.

Summarily, it may be said that the framework 604, combined with the joints of the first and second sets determined as previously described, forms a poly-skeleton of an organic object to be characterized.

Figure 9:
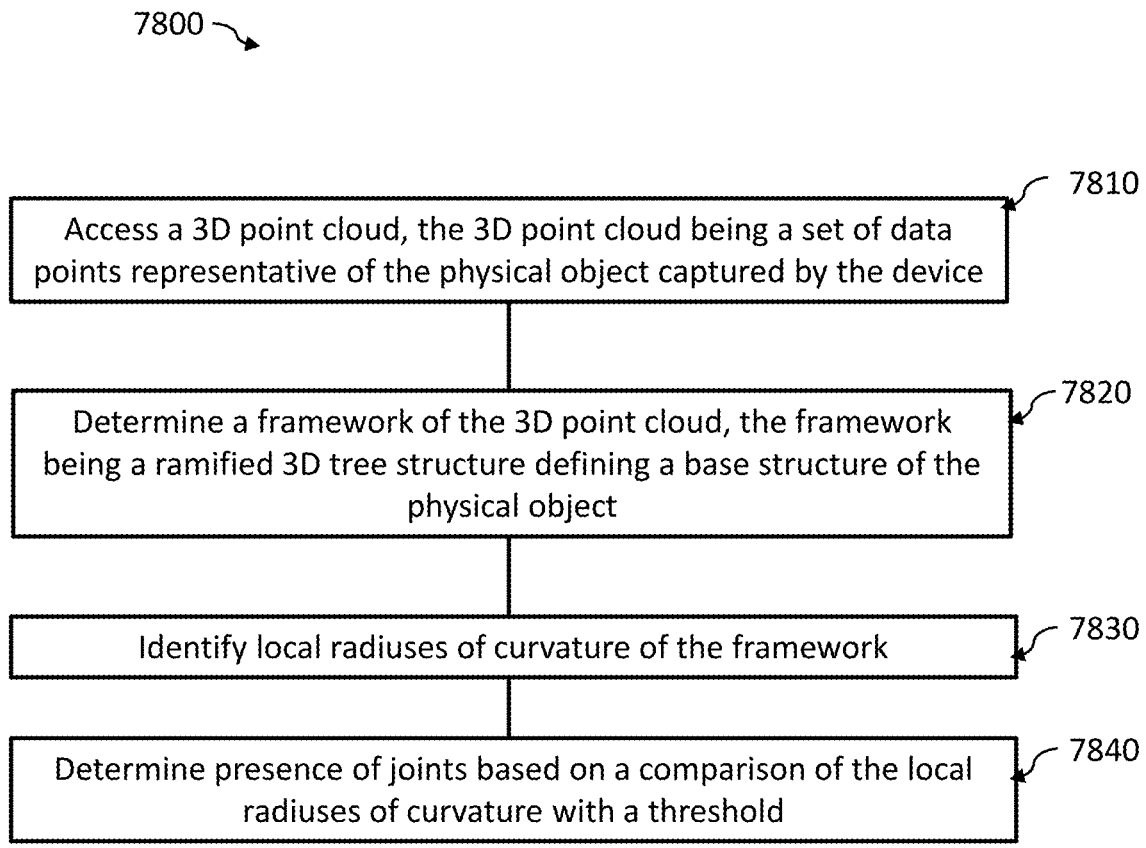
FIG. 9 illustrates a flow diagram showing operations of another method for determining joints of a 3D point cloud in accordance with an embodiment of the present technology.

FIG. 9 is a flow diagram of a method 7800 for determining joints of a object by a device, the joints defining points at which portions of the object move relative to each other, according to some embodiments of the present technology. In one or more aspects, the method 7800 or one or more steps thereof may be performed by a computer system, such as the computer system 100. The method 7800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 7800 comprises accessing, at step 7810, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 7800 also comprises determining, at step 7820, a framework of the 3D point cloud, the framework being a ramified 3D tree structure defining a base structure of the object. As previously described, the ramified 3D tree structure may be determined using the aforementioned mesh contraction routine.

The method 7800 also comprises identifying, at step 7830, local radiuses of curvature of the framework. In this embodiment, a plurality of point may be evenly defined along the framework, a radius of curvature of the framework being determined at each of the feature points.

The method 7800 also comprises determining, at step 7820, determining presence of joints based on a comparison of the local radiuses of curvature with a threshold. In this embodiment, the determining may comprise partitioning the framework in at least one continuous portion. If determination is made that, in a given continuous portion of the framework, the local radius of curvature at a given point of the framework is lower that a pre-determined threshold, a point of the continuous portion having a lowest radius of curvature is determined and marked as a joint of the object.

Figure 8:
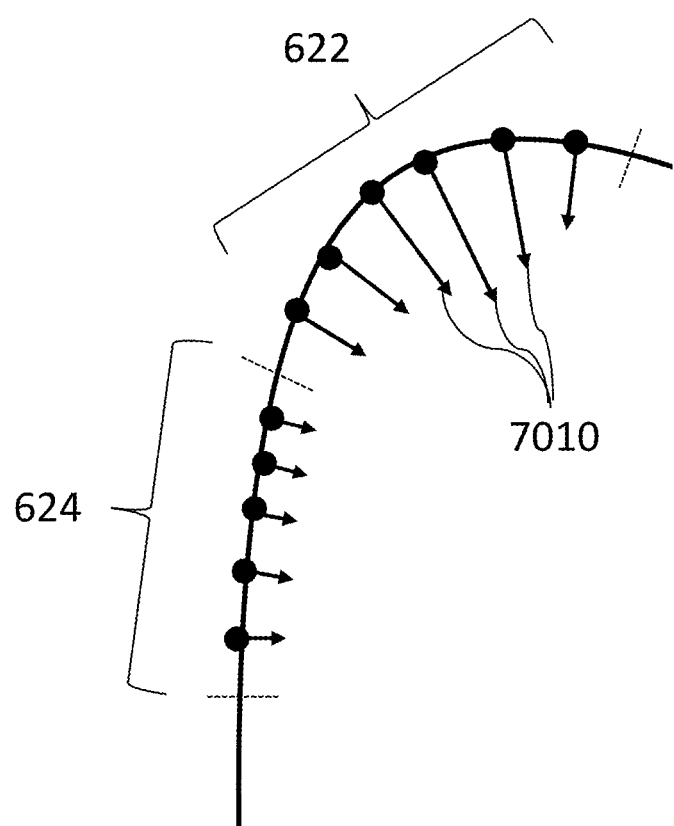
FIG. 8 illustrates a schematic framework in accordance with another embodiment of the present technology.
Figure 10:
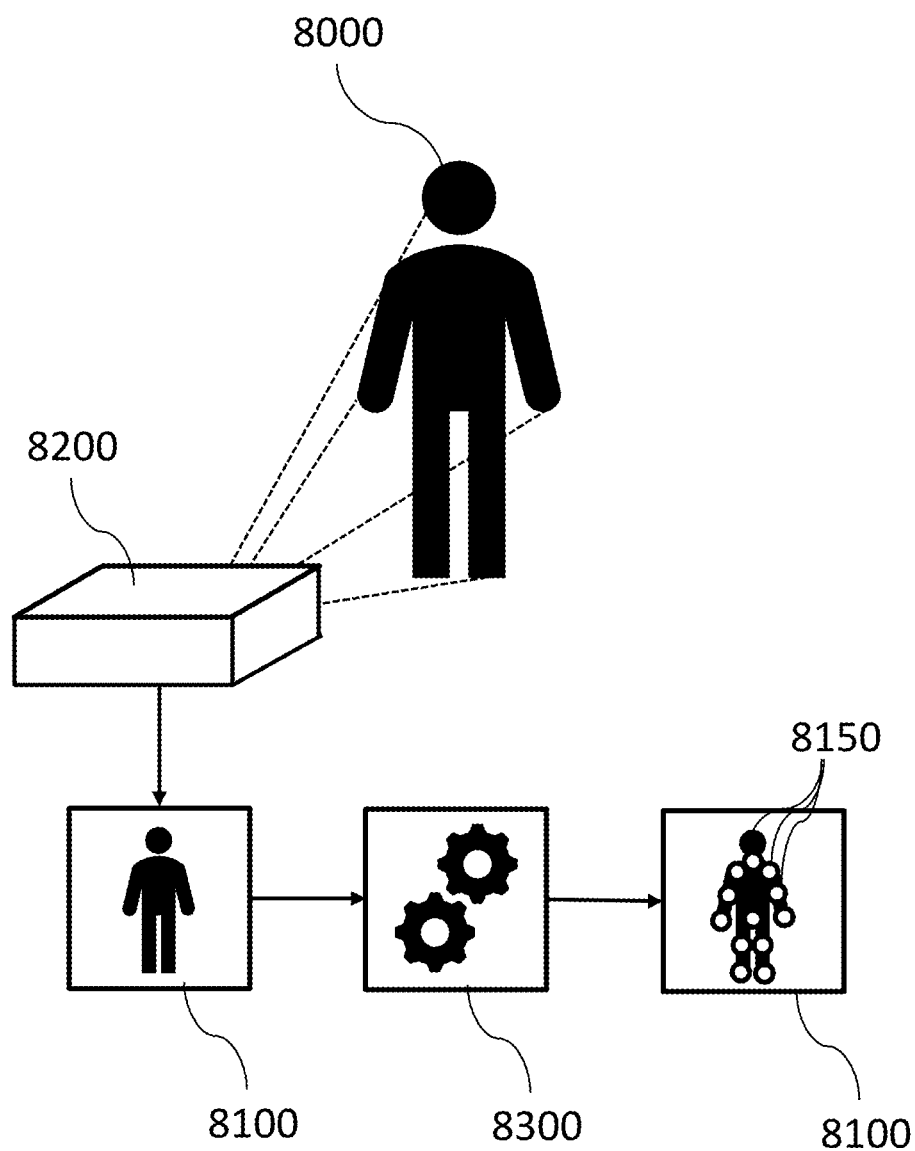
FIG. 10 is a schematic representation of a virtual imaging system for generating 2D projected joints from a 3D reconstructed object in accordance with an embodiment of the present technology.

In another aspect and with reference to FIG. 10, the present technology provides another method for determining a framework of the 3D point cloud. FIG. 8 illustrates a 3D reconstructed object 8000. As previously described, the 3D reconstructed object 8000 is a virtual object based on the 3D point cloud to be characterized, said 3D point cloud having been meshed and/or textured based on know meshing and/or texturing techniques. In this embodiment, a virtual image 8100 is generated according to pre-determined parameters from a given point of view. In other words, it can be said that a known virtual imaging system 8200 disposed at the given point of view generates virtual image 8100. The virtual imaging system 8200 has know parameters (e.g. extrinsic and intrinsic parameters), such as a distance from the 3D reconstructed object 8000, a field of view, image distortion parameters, etc. The known parameters comprise inter alia information about a depth between the virtual imaging system 8200 and the 3D reconstructed object 8000. In this embodiment, the virtual image 8100 is a Red-Blue-Green (RGB) image. It is contemplated that the virtual image 8100 is a Red-Blue-Green-Depth (RGBD) image in alternative embodiments.

As such, the virtual image 8100 is generated according to the known parameters, the virtual image 8100 being a 2D representation of the 3D reconstructed object 8000 viewed from the given point of view. The given point of view may be located at any position in a virtual space around the 3D reconstructed object 8000.

In this embodiment, the virtual image 8100 is further taken as an input of a machine learning algorithm 8300, the machine learning algorithm 8300 having been trained to output, based on the virtual image 8100, 2D projections 8150 of the joints of the objects on the virtual image 8100. In other words, the 2D projections 8150 of the joints are determined by the machine learning algorithm 8300 and are 2D data points of the virtual image 8100 and may thus be referred as "2D projected joints" 8150. The machine learning algorithm 8300 may for example and without limitation determine, based on a neural network architecture, an object represented by the 3D reconstructed object 8000 based on the virtual image 8100 and/or determine the 2D projected joints 8150. The machine learning algorithm 8300 may be implemented according to the teachings of Camera Distance-aware Top-down Approach or 31) Multi-person Pose Estimation from a Single RGB Image Gyeongsik Moon et al.) publised in August 2019. As an example, the object to be characterized may be a human body having a given pose. The virtual image 8100 is thus a virtual image of the 3D reconstructed object 8000 representing the human body in the given pose. The machine learning algorithm 8300 may firstly, determining, based for example on a minimization of a loss function between the virtual image and models of different objects, that the virtual image 8100 is a representation of a human body. The machine learning algorithm 8300 may further determine the 2D projected points 8150 on the virtual image 8100, corresponding to joints of the human body in the given pose. It is contemplated that the machine learning algorithm 8300 may be a virtual reality-based algorithm in alternative embodiments.

In this embodiment, each 2D projected joint is tagged, or labelled, with information about interconnections of the 2D projected joints. Indeed, the machine algorithm 8300 may determine a structural organization of the 2D projected joints, some of the 2D projected joints being interconnected with structural segments, thereby defining a 2D estimated framework of the object on the virtual image 8100. In other words, each 2D projected joint 8150 comprises a tag including information about the relative position of the corresponding 2D projected joint 8150 in the 2D estimated framework of the object.

Figure 11:
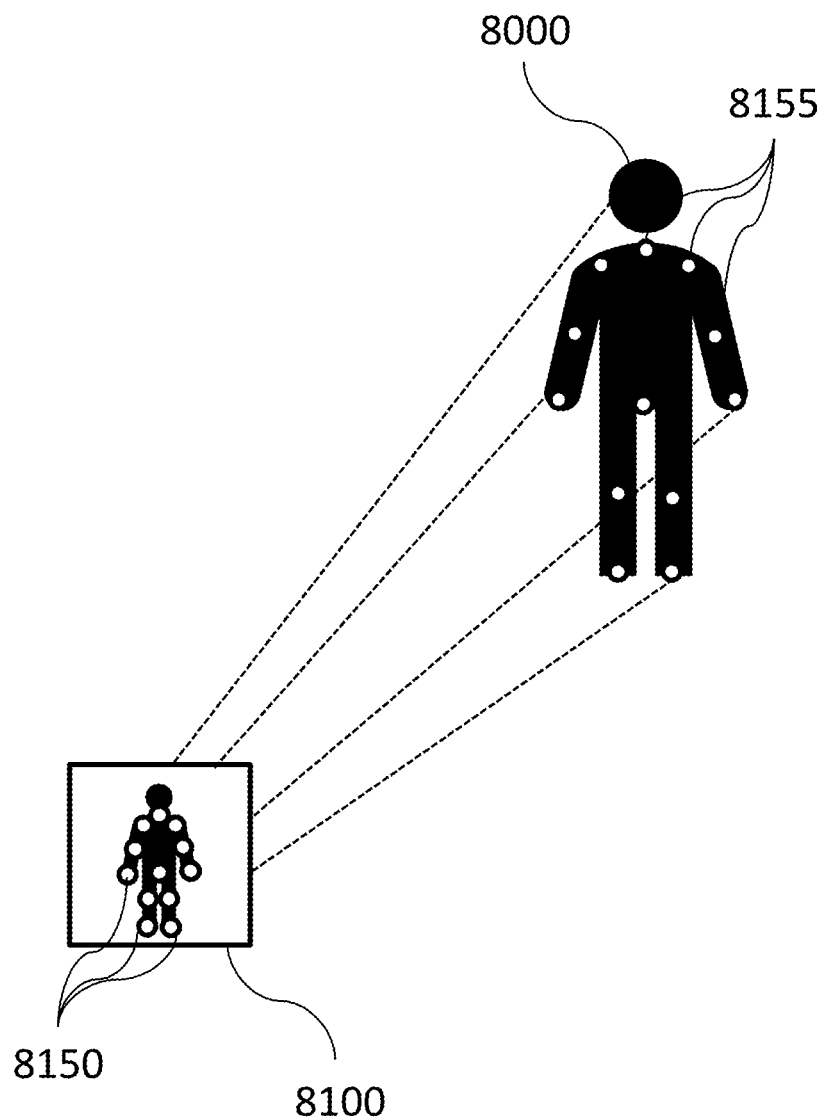
FIG. 11 is a schematic representation of a projection of the 2D projected joints onto the 3D reconstructed object of FIG. 11 in accordance with an embodiment of the present technology.

With reference to FIG. 11, the 2D projected joints 8150 are further projected onto the 3D reconstructed object 8000, thereby generating a corresponding number of 3D projected joints 8155, each 3D projected joint being a projection of a 2D projected joint 8150 onto the 3D reconstructed object. As such, it is contemplated that the 3D projected joints 8155 are located on a surface (e.g, a meshed textured surface) of the 3D reconstructed object 8000.

To do so, the projection of the 2D projected joints 8150 is made based on the parameters used at the generation of the virtual image 8100. In other words, the parameters of the virtual imaging system 8200, such as a relative distance between the virtual imaging system 8200 and the 3D reconstructed object 8000 (i.e, a depth information), are used to determine, on the surface of the 3D reconstructed object 8000, the position of the 3D projected joints 8155.

Based on the tags of the 2D projected joints 8150, a plurality of segment may be generated on the surface of the 3D reconstructed object 8000, thereby defining a surficial framework of the 3D reconstructed object. Indeed, each 3D projected joint 81555 may be connected to one or more other 3D projected joints 8155 based on the information comprised in the 2D estimated framework. More specifically, a given 3D projected joint 8155, which is a projection of a given 2D projected joint 8150, is connected via the surficial framework to 3D projected joints 8155 that are projections of 2D projected joint 8150 connected to the given 2D projected joint 8150.

Figure 12:
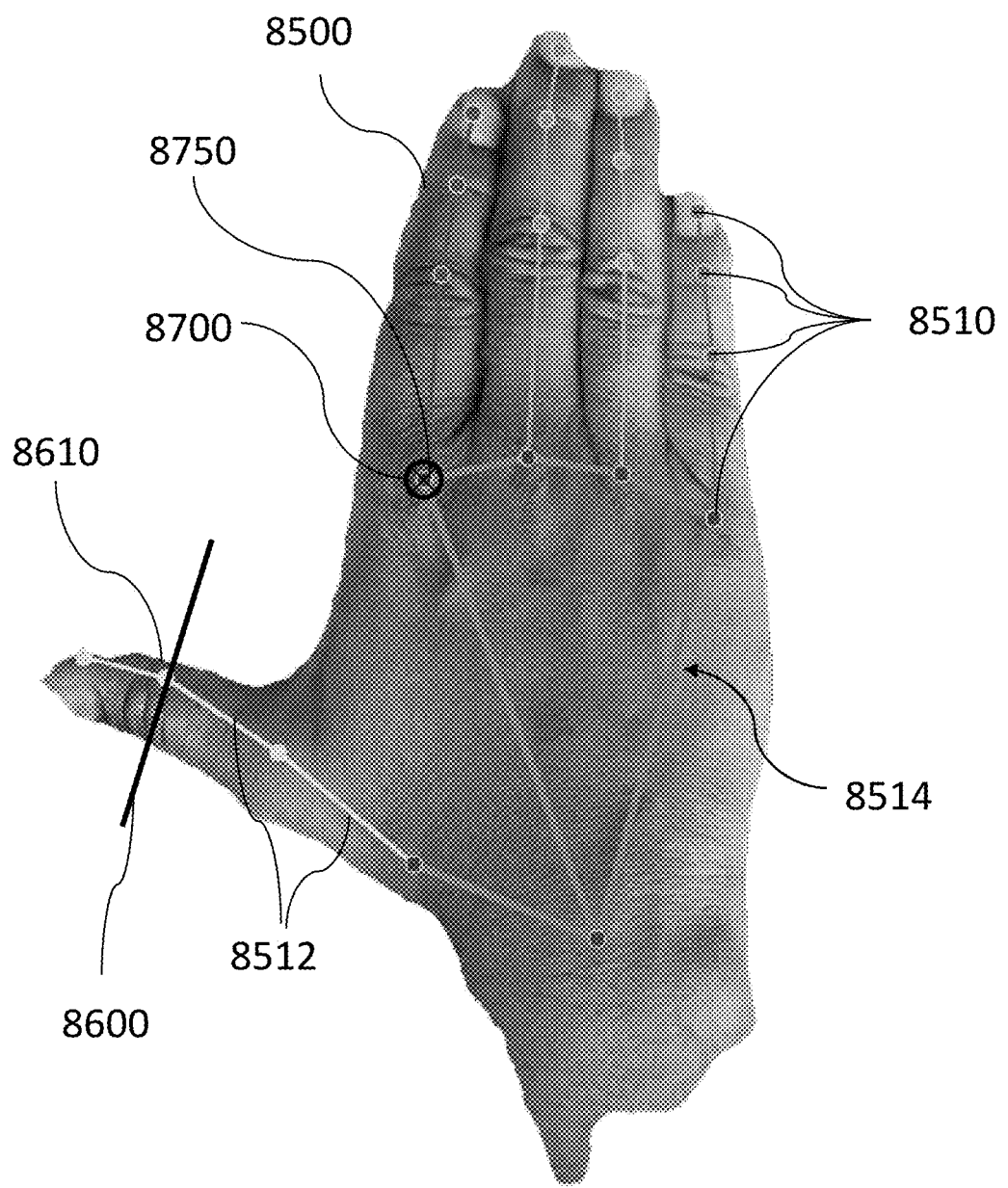
FIG. 12 is a representation of a 3D reconstructed object and a surficial framework thereof in accordance with an embodiment of the present technology.

In the embodiment, a third set of joints is determined based on the 3D projected joints 8155. FIG. 12 is a representation of a 3D reconstructed object 8500 on which 2D projected points have been projected, thereby defining a plurality of 3D projected joints 8510, the 3D projected joints 8510 being interconnected by segments 8512, thereby defining a surficial framework 8514.

One or more joints of the third set of joints are determined within the 3D reconstructed object 8500. It is contemplated that, given that the 3D reconstructed object 8500 is a meshed surface that may be a closed surface based on the meshing technique, the 3D reconstructed object 8500 at least partly defines an internal volume. It is to be understood that in this context, the one or more joints are said to be "within" the 3D reconstructed object 8500 when their position is determined to be in the internal volume defined by the meshed surface of the 3D reconstructed object 8500.

For a given 3D projected joint 8510, the corresponding joint to be determined within the 3D reconstructed object 8500 may be determined according to a plurality of methods. A selection of the method to be applied to determine the corresponding joint may depend, inter alia, on a number of neighboring 3D projected points 8510 of the given 3D projected joint 8510, a local shape of the 3D reconstructed object 8500 at the given 3D projected joint 8510, the tag of the corresponding 2D projected joint on the virtual image, or a combination thereof.

Figure 13:
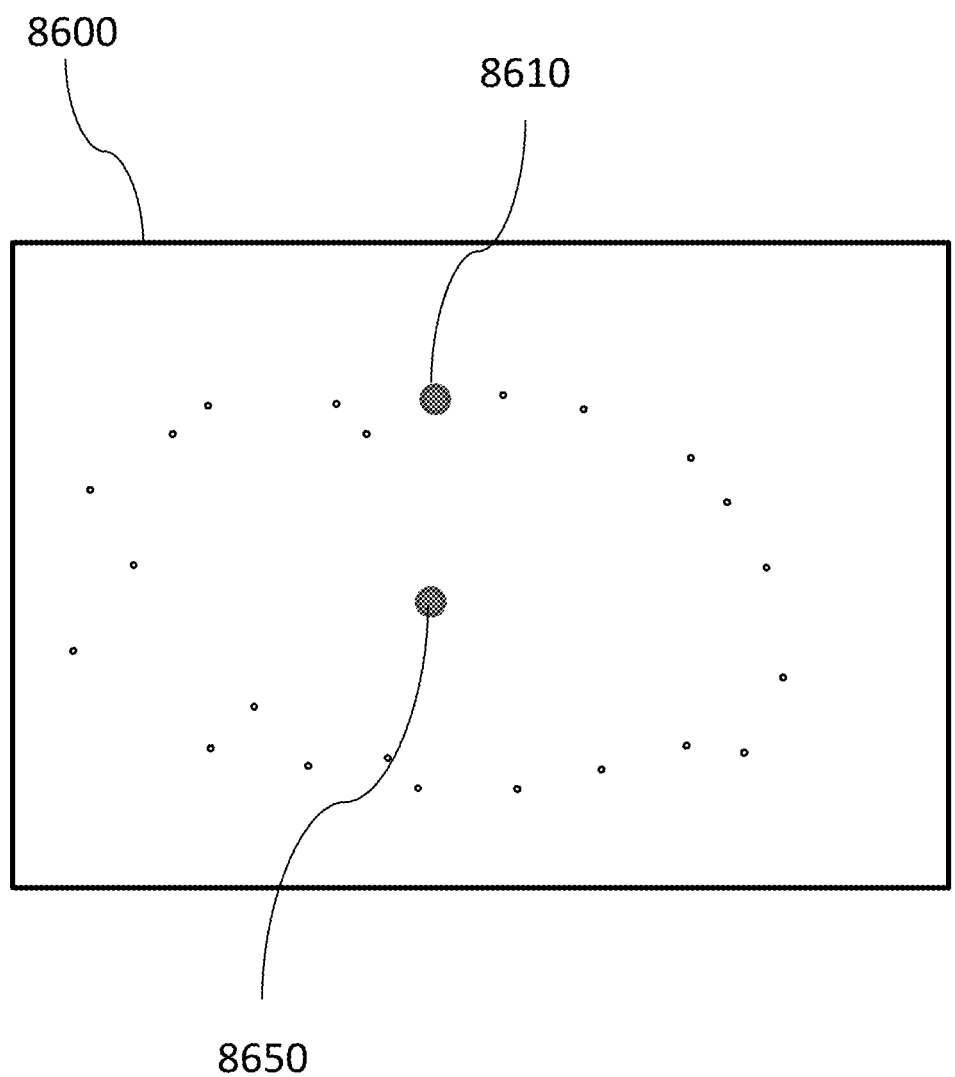
FIG. 13 is a cross-sectional view of the 3D reconstructed object of FIG. 12.

As an example, in some embodiments, an intersecting plane may be determined, the intersecting plane intersecting the 3D reconstructed object and comprising the given 3D projected joint 8510. The intersecting plane may be determined based on the surficial framework 8514 and/or one or more reference axes. More specifically, the intersecting plane may be orthogonal to the surficial framework at the given 3D projected joint 8510. With reference to FIGS. 12 and 13 at once, an intersecting plane 8600 is determined to determine a position of a joint 8650 from a 3D projected joint 8610. As the intersecting plane 8600 intersect the 3D reconstructed object 8000, the intersecting plane 8600 comprises a plurality of data points of the 3D reconstructed object (i.e. data points of the 3D point cloud). In this embodiment, a position of the joints is determined as a barycenter of the data points of the 3D reconstructed object 8000 that are comprised in the intersecting plane 8600. In some other embodiments, the intersecting plane is orthogonal to references axes, such as a gravity axis, a main axis extending between two data points of the 3D point cloud (e.g. two data points that maximize a distance between any two given data points amongst the 3D point cloud), a portion of the framework of the 3D reconstructed object or a tangent to the framework, or other axis.

Figure 14:
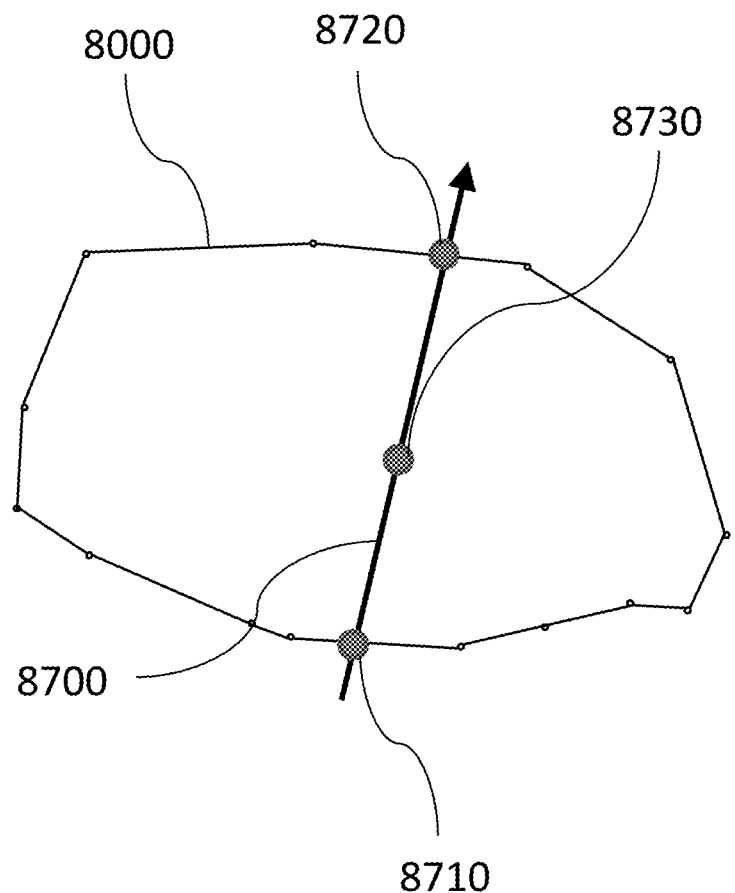
FIG. 14 is another cross-sectional view of the 3D reconstructed object of FIG. 12.

In some other embodiment, a vector normal to the 3D reconstructed object 8000 at the given 3D projected joint 8510. As the 3D reconstructed object 8000 may be a meshed closed surface, said vector may intersect the 3D reconstructed object 8000 at point of the 3D reconstructed object 8000 that is different from the given 3D projected joint 8510. With reference to FIGS. 12 and 14 at once, a vector 8700 is determined to determine a position of a joint 8750 from a given 3D projected joint 8710. More specifically, the vector 8700 is orthogonal to the 3D reconstructed object at the given 3D projected joint 8710. As the 3D reconstructed object 8000 may be a meshed closed surface, the vector 8700 may interest the 3D reconstructed object 8000 in one or more intersection points that are distinct from the 3D projected joint 8710. A closest intersection point 8720 is determined as being one of the intersection points that is the closest to the 3D projected joint 8710. A position of the joint 8730 is set between the 3D projected joint 8710 and the closest intersection point 8720. For example, the positions of the 3D projected joint 8710 and the closest intersection point 8720 may be averaged to determine the joint 8730.

As such, each joint of the third set of joints is determined based on a corresponding 3D projected joints 8510. A framework of the 3D reconstructed object 8000 may thus be determined by interconnecting the joints of the third set with structural segments according to interconnections of the surficial framework 8154.

Figure 15:
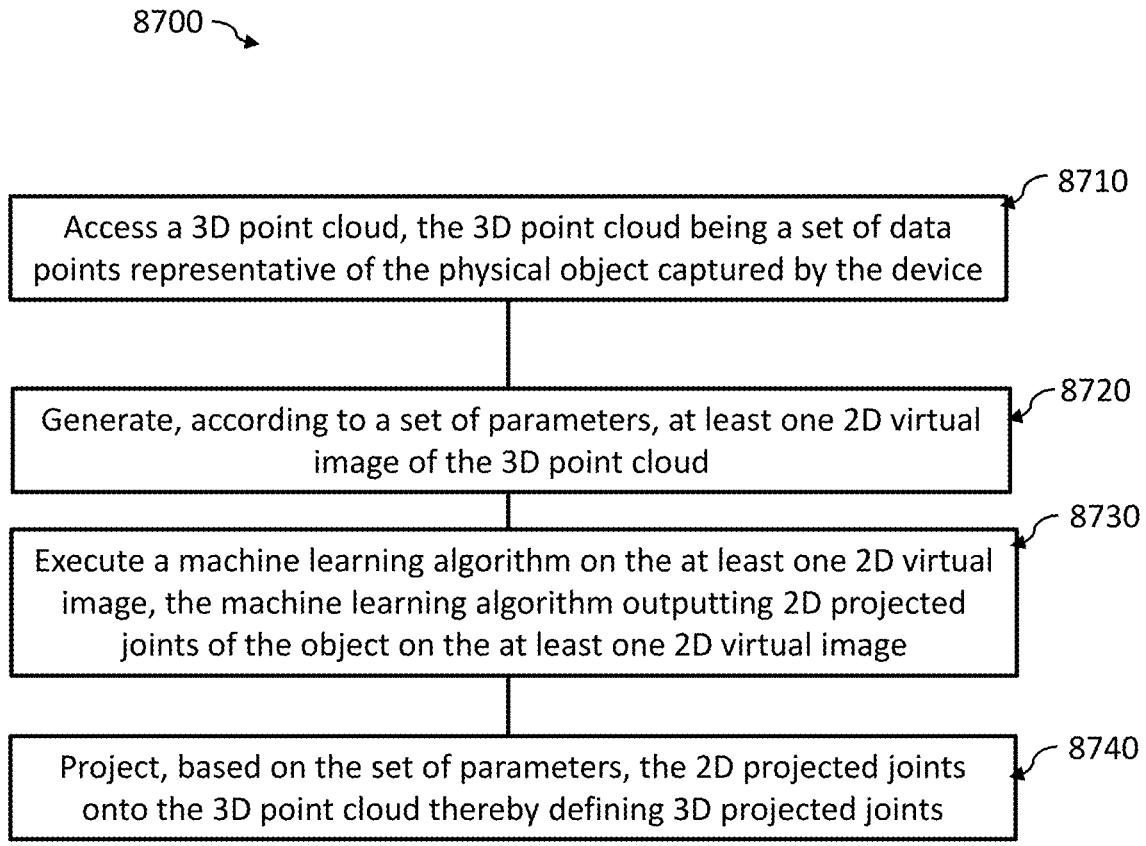
FIG. 15 illustrates a flow diagram showing operations of yet another method for determining joints of a 3D point cloud in accordance with an embodiment of the present technology.

FIG. 15 is a flow diagram of a method 8700 for determining joints of a object by a device, the joints defining points at which portions of the object move relative to each other, according to some embodiments of the present technology. In one or more aspects, the method 8700 or one or more steps thereof may be performed by a computer system, such as the computer system 100. The method 8700 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 8700 comprises accessing, at step 8710, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 8700 also comprises generating, at step 8720, at least one 2D virtual image of the 3D point cloud according to a set of parameters. The at least one2D virtual image may be generated, for example, in a same manner that the 2D virtual image 8100 is generated.

The method 8700 also comprises executing, at step 8730, a machine learning algorithm on the at least one 2D virtual image, the machine learning algorithm outputting 2D projected joints of the object on the at least one 2D virtual image.

The method 8700 also comprises projecting, at step 8740, based on the set of parameters, the 2D projected joints onto the 3D point cloud thereby defining 3D projected joints. As such, the 3D projected points are located on a surface of the 3D point cloud. The 3D projected joints may be interconnected based on interconnections of the 2D projected points on the 2D virtual image. As such, the 3D projected joints and interconnections between them define a surficial framework on the surface of the 3D point cloud.

In some embodiments, the method 8700 may further comprise determining, for a given 3D projected joint, a slice of the 3D point cloud comprising the 3D projected joint and determining a position of the joint within the slice of the 3D point cloud. In the same or other embodiments, the method 8700 may further comprise defining one or more reference axes and defining a slice of the 3D point cloud based on the one or more reference axis, the slice comprising the 3D projected joint. For each 3D projected joint, a given joint may be determined. For example, a vector extending from the 3D projected joint may be determined based on the 3D projected joint and the one or more reference axes, the 3D projected joint thereby defining a first intersection of the vector with the 3D point cloud. A second intersection of the vector with the 3D point cloud may be further determined, the corresponding joint being defined as an average point between the first and second intersection as the joint. Alternatively, the position of the joint within the 3D point cloud may be an average position of the positions of data points of the 3D point cloud comprised in the slice.

Figure 16:
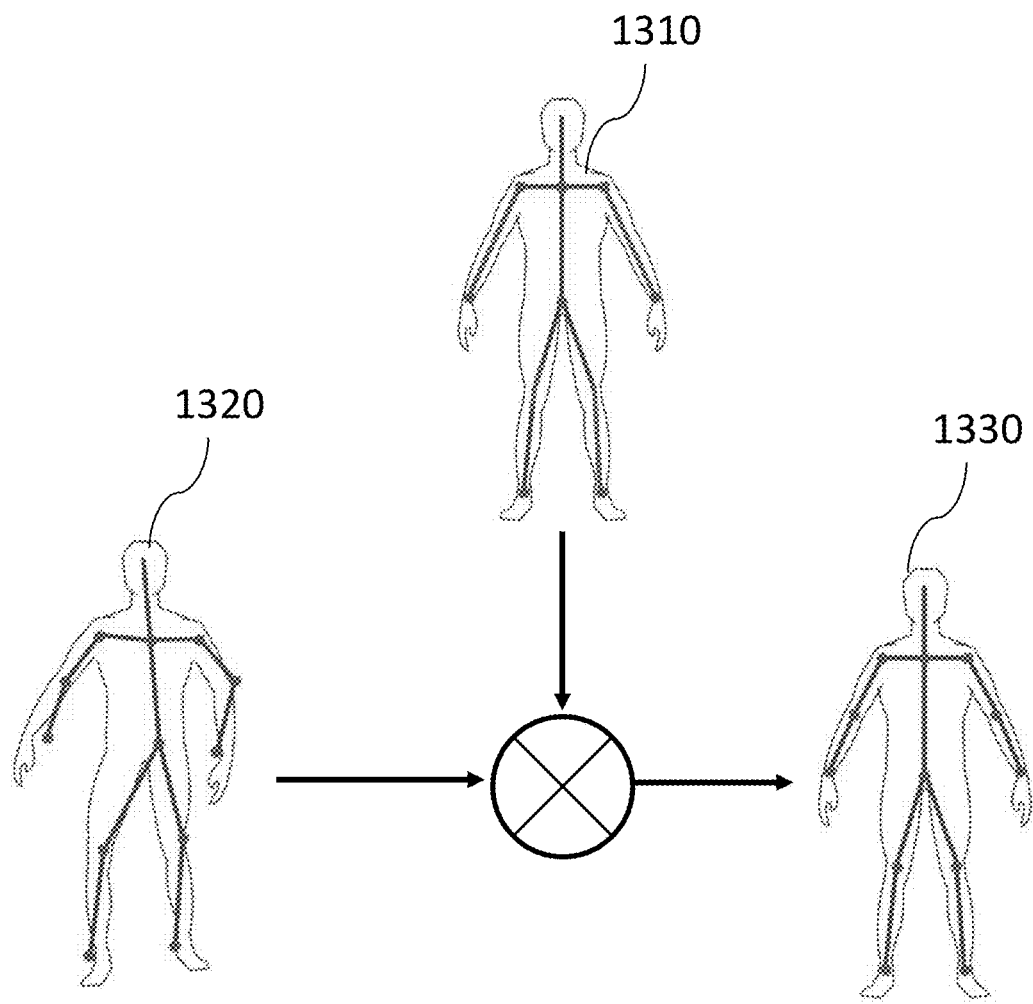
FIG. 16 illustrates a schematic representation of an alignment of a framework onto another framework in accordance with an embodiment of the present technology.

With reference to FIG. 16, a first framework 1310 and a second framework 1320 of a same reference object 1300 are depicted. The first framework 1310 has been determined based on the method 670, the method 7800 or a combination of outputs of the methods 670 and 7800 and thus comprises a first joints that has been determined based on ramifications and/or curvature of the framework 1310. The second framework 1320 has been determined based on the method 8700 and thus comprises a second set of joints that has been determined at least partly based on an output of the machine learning algorithm, such as the machine learning algorithm 8300.

In this embodiment, the first and second frameworks 1310, 1320 are combined, the first and second frameworks 1310, 1320 having been generated in a 3D space of the 3D point cloud. More specifically, for each joint of the second framework 1320, a closest point of the first framework 1310 is determined, a distance between the given joint of the second framework 1320 and said closest point being the shortest distance between the joint of the second framework 1320 and the first framework 1310. The given joint of the second framework 1320 is further moved onto the corresponding closest point, thereby causing a modification of a pose of the second framework 1320. Positions of each joints of the second framework 1320 are adjusted in a similar manner, thereby modifying the pose of the second framework 1320 according to a pose of the first framework 1310. It can be said that the second framework 1320 is aligned onto the first framework 1310. To ease an understanding of the present disclosure, the aligned second framework 1320 may be referred to as a third framework 1330. As such, it can be said that the third framework 1330 comprises a number of joints that has been determined by the machine learning algorithm 8300 and that the pose of the third framework 1330 matches the pose of the first framework 1310. The third framework 1330 is further used as the framework of the 3D reconstructed object.

Figure 17:
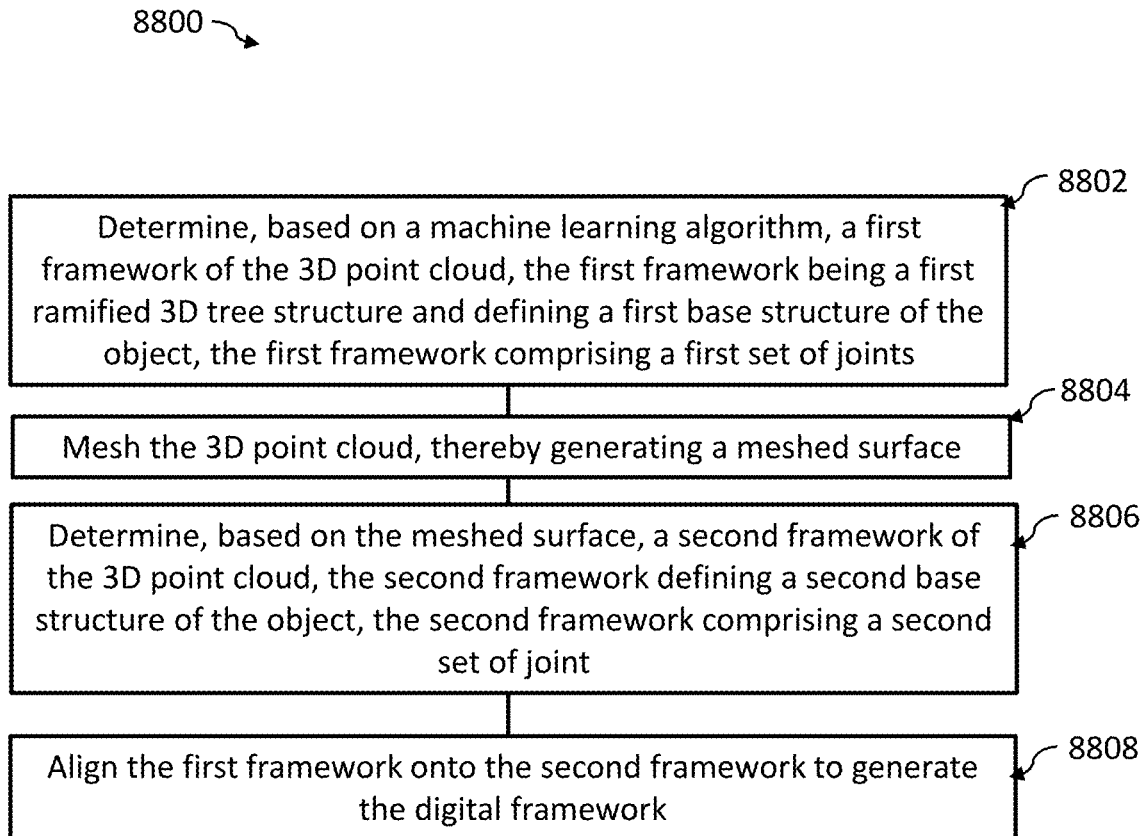
FIG. 17 illustrates a flow diagram showing operations of a method for determining a framework of a 3D point cloud in accordance with an embodiment of the present technology.

FIG. 17 is a flow diagram of a method 8800 for determining joints of a object by a device, the joints defining points at which portions of the object move relative to each other, according to some embodiments of the present technology. In one or more aspects, the method 8800 or one or more steps thereof may be performed by a computer system, such as the computer system 100. The method 8800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 8800 comprises determining, at step 8802, a first framework of the 3D point cloud based on a machine learning algorithm, the first framework being a first ramified 3D tree structure and defining a first base structure of the object, the first framework comprising a first set of joints. Said first framework may be determined by executing steps of the method 8700 onto the 3D point cloud.

The method 8800 comprises meshing, at step 8804, the 3D point cloud, thereby generating a meshed surface. The meshed surface may be formed by performing known meshing techniques such as Dirichlet triangulation meshing, Delaunay triangulation meshing, or any other suitable techniques for generating a meshed surface.

The method 8800 comprises determining, at step 8806, a second framework of the 3D point cloud based on the meshed surface, the second framework defining a second base structure of the object, the second framework comprising a second set of joint. Said second framework may be determined by executing steps of the method 670 onto the 3D point cloud.

The method 8800 comprises aligning, at step 8808, the first framework onto the second framework to generate the digital framework.

Figure 18:
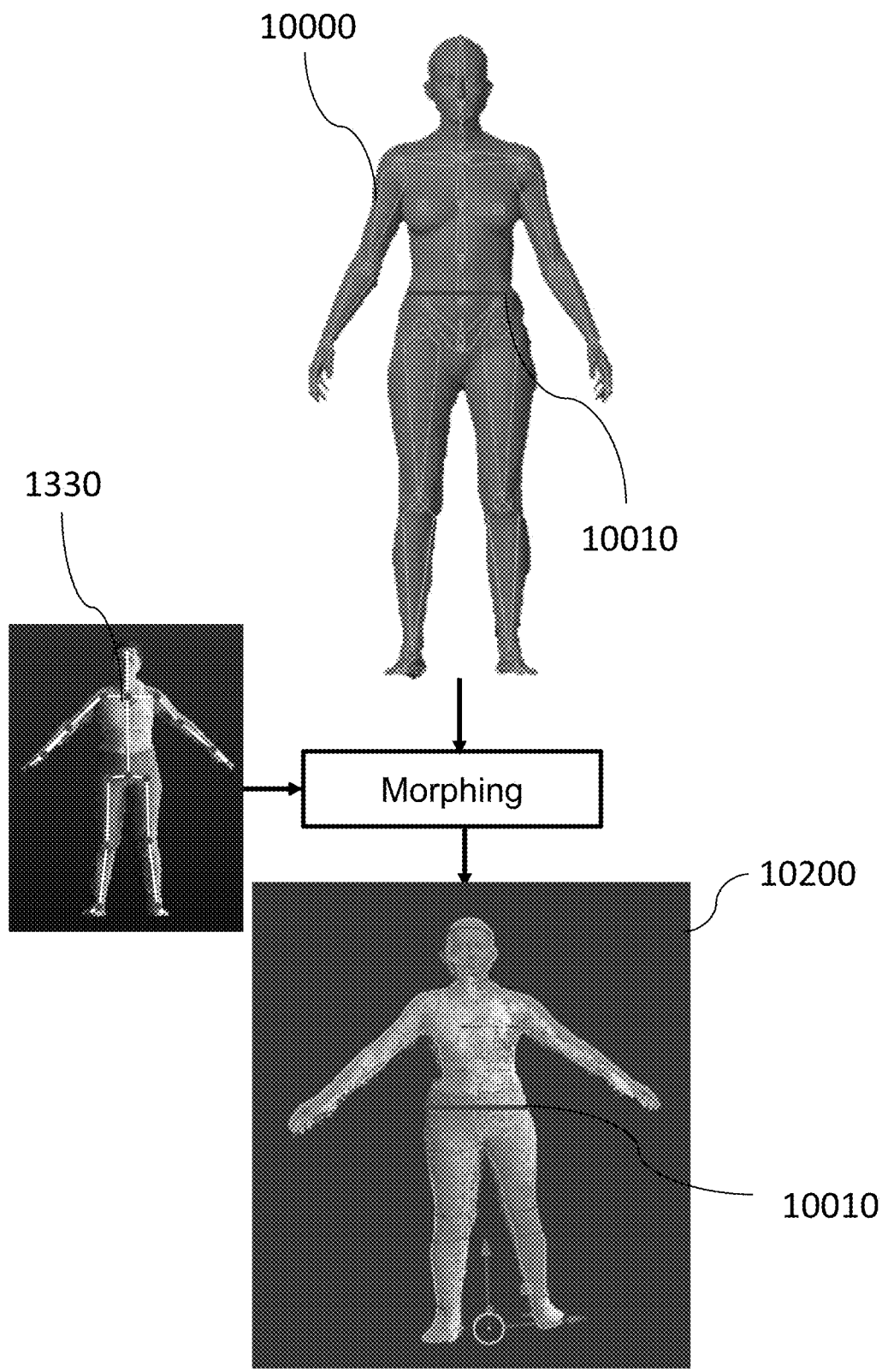
FIG. 18 illustrates a schematic representation of a morphing of a 3D reference model onto a 3D reconstructed object in accordance with an embodiment of the present technology.

Now referring to FIG. 18, in the same or another embodiment, a 3D reference model 10000 of the object is used to determine areas of interest of the 3D point cloud. More specifically, the 3D reference model 10000 is a virtual object modelling the object to be characterized. The 3D reference model 10000 comprises a model framework, the model framework comprising one or more joints when the modelled object is a non-rigid object. The 3D reference model 10000 may be selected amongst a plurality of 3D reference models based, for example and without limitation, on an output of the machine learning algorithm 8300. As an example, the 3D reference model 10000 models a human body, and may be selected by the machine learning algorithm 8300 or another dedicated object detection algorithm to be used to characterize the 3D point cloud representing a human body. It is contemplated that the object to be characterized may be, for example and without limitation, a mechanical tool, piece of equipment, or industrial part. As such, the 3D reference model may be a virtual representation of the object generated via, for example, known Computer-Aided Design (CAD) model generation techniques, 3D modelling software, 3D scanning devices suitable for generating 3D model of the object.

In this embodiment, the 3D reference model 10000 comprises one or more landmarks, a landmark being a virtual indication of a feature localized on the 3D reference model 10000. The 3D reference model is further morphed onto the 3D reconstructed object. Said morphing may be performed based on the framework 1330 of the 3D reconstructed object. In at least some embodiments, morphing the 3D reference model 10000 onto the 3D reconstructed object comprises determining a first seed joint amongst the joints of the 3D reference model 10000 and a second seed joint amongst the joints of the framework 1330 of the 3D reconstructed object, and moving the first seed joint onto the second seed joint, thereby adjusting a pose of the 3D reference model 10000 to match a pose of the 3D reconstructed object. In one embodiment, the first and second seed joints may be the lowest joints (having a lowest z-coordinate in the 3D space of the 3D reconstructed object) amongst the joints of the 3D reference model 1000 and the joints of the framework 1330 respectively. In another embodiment, the first and second seed joints may be the joints that are the furthest from any other joints in both of the 3D reference model 1000 and the framework 1330 respectively. In yet other embodiments, the first and second seed joints may be identified based on edge detection, number of neighboring joints, curvature of the framework, and/or any other measurable characteristics of the 3D reference model 10000 and the 3D reconstructed object.

Once the first seed joint has been moved onto the second seed joint, subsequent joints of the 3D reference model 10000 along the framework thereof are moved onto subsequent joints of the framework 1330. As such, once each joint of the 3D reference model 10000 has been moved onto a corresponding one joint of the framework 1330, the pose of the 3D reference model 10000 matches the pose of the 3D reconstructed object.

In this embodiment, a shape of the 3D reference model 10000 may further be adjusted to match a shape of the 3D reconstructed object. More specifically, morphing the 3D reference model 10000 onto the 3D reconstructed object may comprise adjusting a topology of the 3D reference model 10000 to match a topology of the 3D reconstructed object. For example and without limitation, said topology adjustment may be performed according to the teachings of the U.S. Provisional Patent Application No. 62/952,193 filed on Dec. 20, 2019, the disclosure of which is incorporated by reference herein in its entirety.

Once the 3D reference model 10000 has been morphed onto the 3D reconstructed object and that the topology of the 3D reference model 10000 matches the topology of the 3D reconstructed model, the landmarks of the 3D reference model 10000 gives information about areas of interest on the 3D reconstructed object.

An output 10200 of the morphing of the 3D reference model 10000 onto the 3D reconstructed object is represented on FIG. 18 and comprises the 3D reference model 10000 morphed onto the 3D reconstructed object. It can be said that the 3D reference model 10000 is superimposed on the 3D reconstructed object. As such, the landmarks localized on the surface of the 3D reference model 10000 are also defined on a surface of the 3D reconstructed object. The landmarks thus give indication of areas of interest on the 3D reconstructed model. Geometrical characterization of the 3D reconstructed object may thus be performed in the areas of interest.

In the context of the present disclosure, the landmarks of the 3D reference model 10000 may be defined anywhere onto the 3D reference model 10000 (e.g, a wrist of the human body) such that, upon morphing 3D reference model 10000 onto the 3D reconstructed object, an area of interest is defined on the 3D reconstructed object. In the context of the present disclosure, the terms "area of interest" and "search area" are equivalent and refer to an area of the 3D reconstructed object and/or of the 3D point cloud where gematrical characterization and measurements should be performed. As an example and without limitation, a landmark may be a slice of the 3D reference model 10000, a portion of the surface of the 3D reference model 10000, a planner surface at a given location, a normal line at a given location, or a point of the of the 3D reference model 10000, thereby defining a corresponding slice, portion of the surface, or point of the 3D reconstructed object respectively.

As an example and with reference to FIG. 18, the 3D reference model 1000 models a human body and comprises a landmark 10010 under the form of a slice at the waist. Upon morphing the 3D reference model 1000 onto the 3D reconstructed object, the landmark 10010 gives an indication of a corresponding area of interest on the 3D reconstructed object. For example, in some embodiment, the area of interest may be defined as portion of the 3D reconstructed object having a pre-determined surface and containing the landmark 10010. In the same or another embodiment, the landmark 10010 define a slice of the 3D reconstrued model, geometrical characteristics of the slice being further determined. In the illustrative example of FIG. 18, the landmarks 10010 define a slice of the 3D reconstructed model corresponding to a waist of the object, a measure of a perimeter of the defined slice being defined as a waist circumference of the object.

In the same or another embodiment of the present technology, the areas of interest of the 3D reconstructed object may be refined and/or entirely determined based on characteristics of the 3D point cloud and independently from the 3D reference model 10000.

Figure 19:
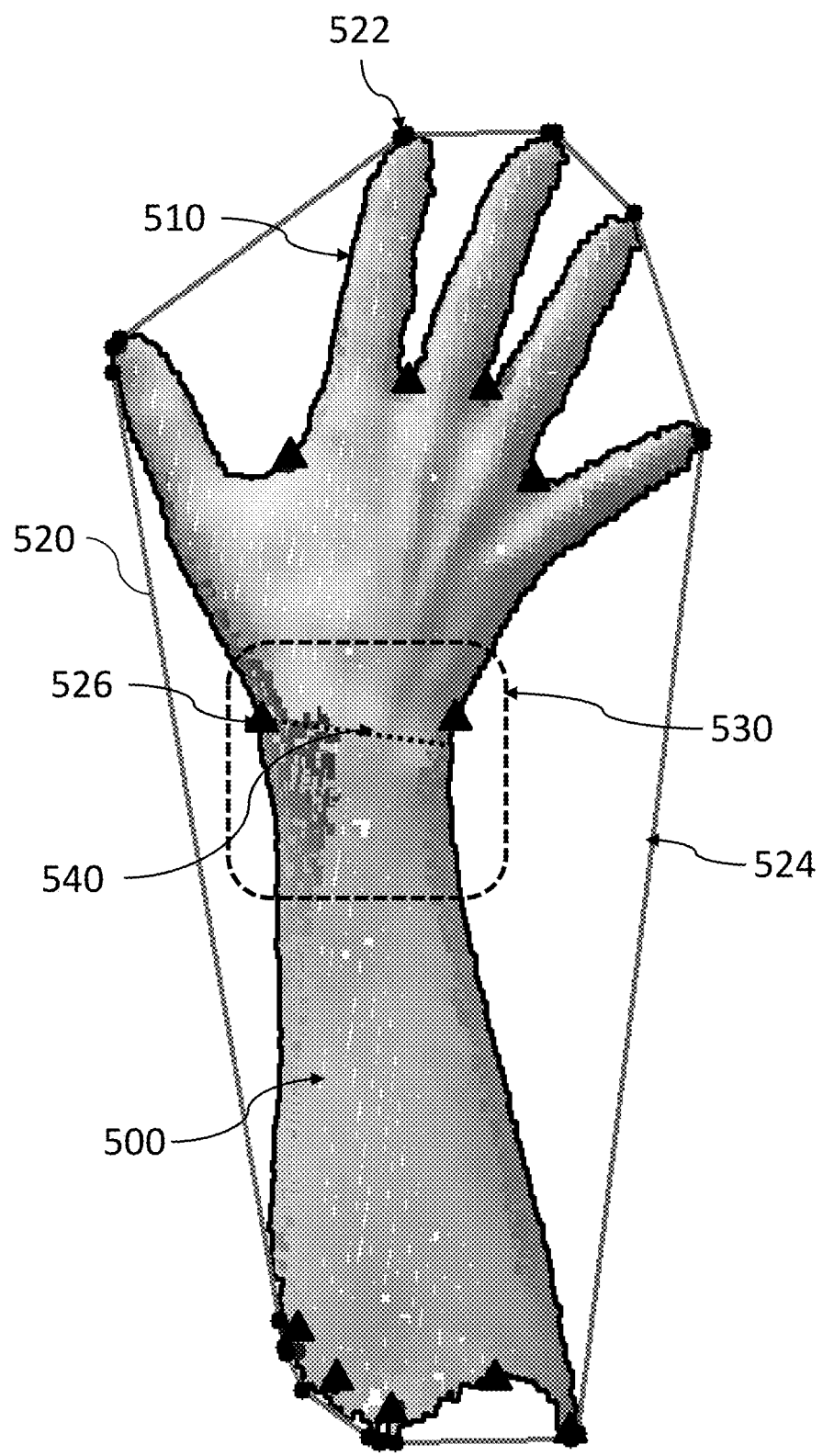
FIG. 19 illustrates a 2D projection of a 3D point cloud onto a projection plane in accordance with an embodiment of the present technology.
Figure 20:
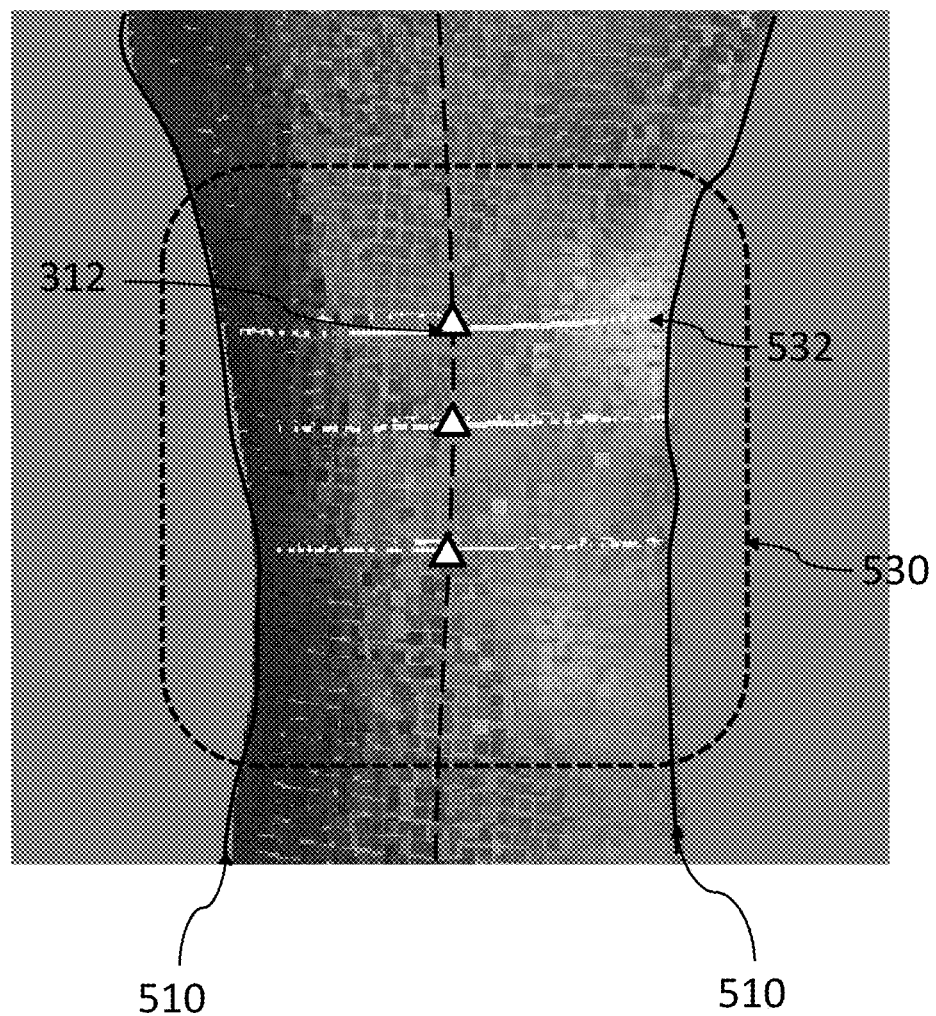
FIG. 20 illustrates a portion of a 2D projection of a 3D point cloud onto a projection plane in accordance with an embodiment of the present technology.
Figure 21:
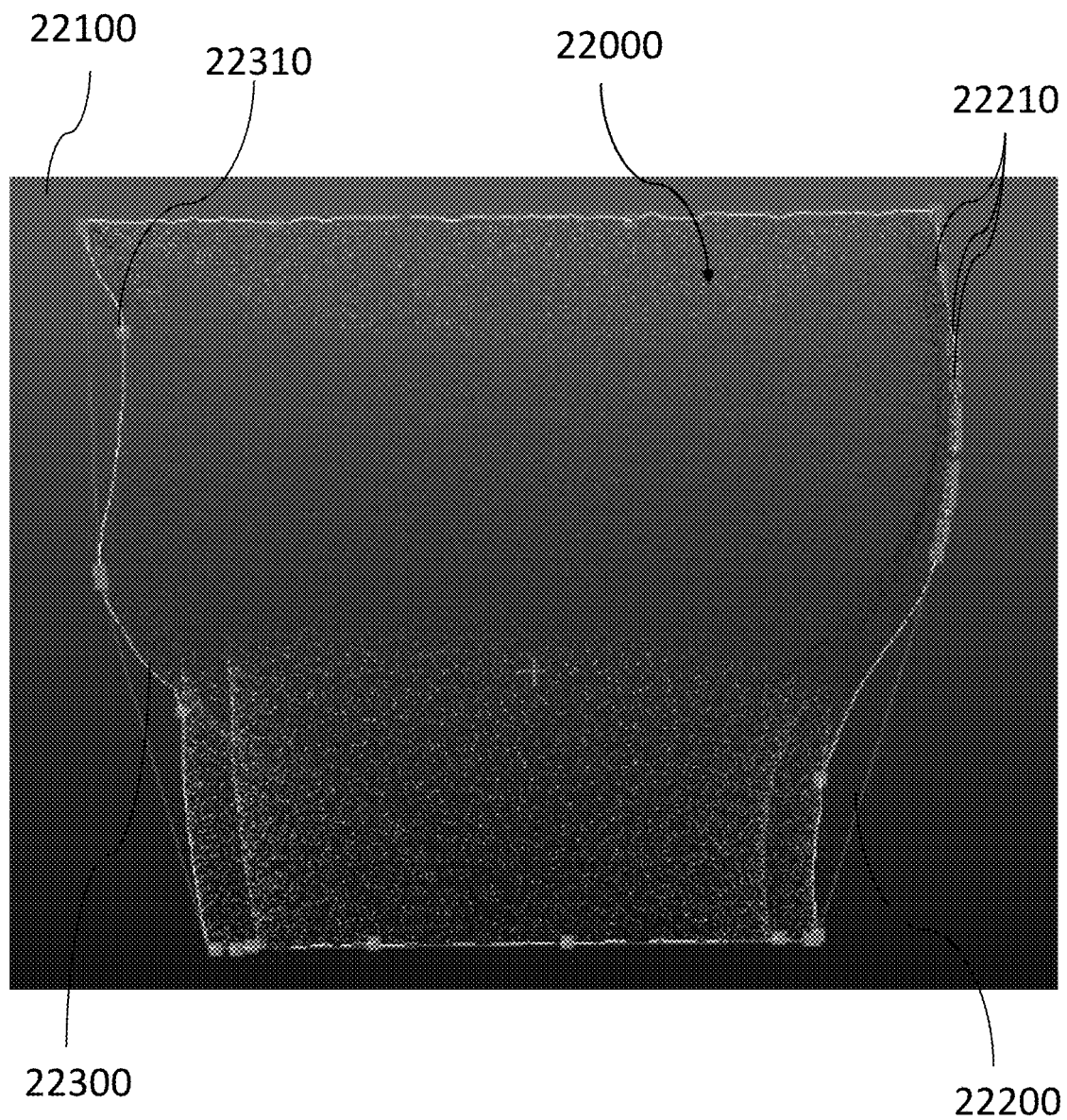
FIG. 21 illustrates a 2D projection of a 3D point cloud onto a projection plane in accordance with an embodiment of the present technology.

With reference to FIGS. 19 and 20, an illustrative process for determining aeras of interest is described. FIG. 19 illustrates a two-dimensional (2D) projection 500 of the 3D point cloud 200 in accordance with at least some embodiments of the present technology. In the illustrative example of FIG. 19, the 2D projection 500 is made on a plane facing a palm side or a rear side of the hand. As an example, said plane may be determined based on the background point 20 defining a plane on which the object to be characterized is laying. Identification of said plane may be performed during an acquisition of the 3D point cloud for instance. A contour 510 of the 2D projection of the 3D point cloud 200 may be generated by the computer system 100. The contour 510 may be generated based on known techniques such as determination of a concave hull of the 2D projection 500. Therefore, the contour 510 may be a line comprising a sub-group of the points 20 of the 3D point cloud and may correspond to an outer shape of a 2D projection of the 3D point cloud 200.

A convex hull 520 of the contour 510 may be generated by the computer system 100. The convex hull 520 may comprise a plurality of convex hull feature points 522 defining the convex hull 520, two subsequent convex hull feature points 522 being interconnected by a segment 524. The convex hull feature points 522 may be comprised in the points 20 of the 3D point cloud 200 and in the contour 510.

Each segment 524 comprising two consecutive convex hull feature points 522 of the convex hull 520 may correspond to a portion of the contour 510 located between said two consecutive convex hull feature points 522. For each segment 524, a valley feature point 526 may be determined as the furthest point of the corresponding portion of the contour 510. More precisely, for each point of the corresponding portion of the contour 410, an orthogonal distance between said point and the corresponding segment 424 is determined. The valley feature point 526 of a segment 524 may have the maximal orthogonal distance with its corresponding segment 524. A combination of the convex hull feature points 522 and the valley feature points 529 may be referred to as "feature points".

Two feature points corresponding to the wrist portion 220, or "wrist feature points" may be determined by the computer system 100, the two wrist feature points corresponding to each side of the wrist portion 210 respectively. Based on the coordinates of the convex hull feature points 522, a length of the segments 524 may be determined by the computer system 100. Based on lengths of the segments 524, the computer system 100 may be configured to identify a first segment 524 and a second segment 524 having a highest length and a second-highest length respectively. The valley feature points 526 associated with the first and second segments 524 may be identified as the two wrist feature points. In the illustrative example of FIG. 19, the first and second segments 524 having the highest lengths are located on sides of the forearm, both of the first and second segments 524 connecting one convex hull feature points 522 located on the hand to one convex hull feature points 522 located on the forearm.

Once the two wrist feature points are defined, a search area 530 to find the wrist width may be determined in a vicinity of the two wrist feature points in the contour 510. To define the search area, the computer system 100 may, for instance and without limitation, determine a line 540 intersecting the contour 510 in at least two points, each of the at least two points belonging to a distinct portion of the contour 510, one of them being one of the two wrist feature points, and being orthogonal to the average line 310 may be determined. The search area 530 may be a surface extending from one side or from both side of the line 540. Additionally or alternatively, the search area may be a volume comprising points of the 3D point cloud 200 and comprising both of the wrist feature points.

A plurality of search areas 530 may be defined. The aforementioned determination of the search area is aimed at finding the wrist width. However, multiple search areas may be determined to find multiple corresponding features of the 3D point cloud, such as circumferences, lengths, volumes, distances, and/or any other feature that may be determined based on the 3D point cloud. Additionally or alternatively, definition of the search areas may be based on a model of the object to be characterized. Such model may comprise areas indicative of locations of said corresponding features. The model and the 3D point cloud may be compared, for instance by superimposing or aligning the model and the 3D point cloud, to identify the search areas 530 on the 3D point cloud, each search area 530 corresponding to a location of an area indicative of location of a corresponding feature on the model.

FIG. 20 illustrates the search area 530 in accordance with at least some embodiments of the present technology. As defined hereinbefore, the search area 530 may comprise two distinct portions of the contour 510. A plurality of wrist segments 532 may be identified within the search area 530, each wrist segment 532 joining two points of the contour 510 and being orthogonal to the average line 310. Each wrist segment 532 may comprise a corresponding one of the average points 312. A number of wrist segments 532 may be determined based on a resolution of the 3D point cloud 200, on a number of average points 312, and/or a number of points 20 in the contour 410 located within the search area 530. The wrist width may be identified as a length of a shortest wrist segment 532.

Figure 22:
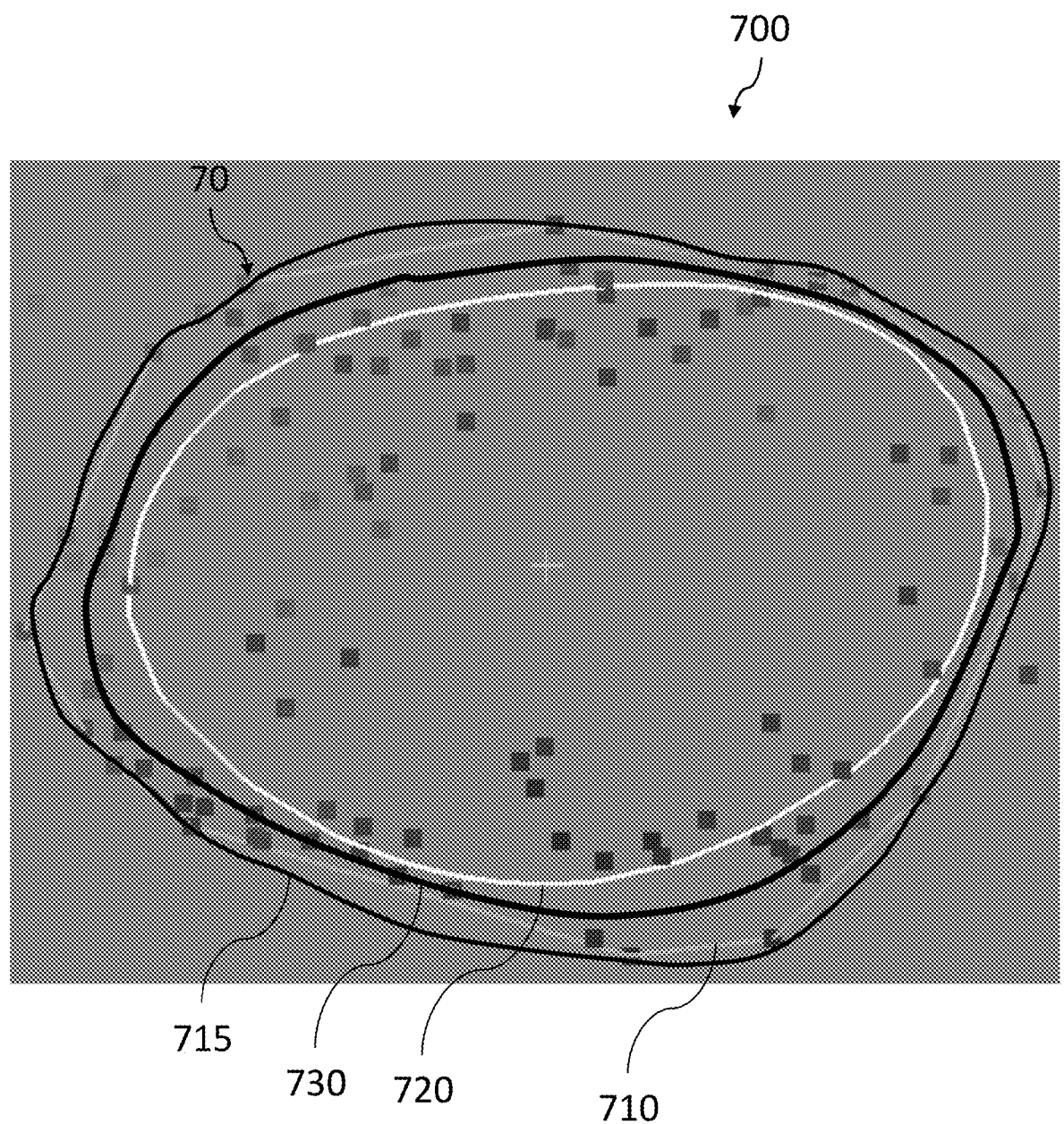
FIG. 22 illustrates a slice in accordance with an embodiment of the present technology.

Additionally or alternatively, slices of the 3D point cloud 200 may be identified to further determine the wrist width with a different approach. Determination of the slices is described in greater details hereinbelow:

In another aspect and with reference to FIG. 22, another process for determining and/or reining areas of interest is described. FIG. 22 illustrates a projection 22000 of data points of a 3D point cloud onto a projection plane 22100. In this embodiment, a convex hull 22200 of the projection 22000 is determined, and a convexity defect analysis is executed onto the convex hull 22200. The convexity defect analysis may be, for example and without limitation, executed by applying a function cv2.convexity Defects( )provided by the OpenCV platform, to the convex hull 22200. The convexity defect analysis provides a plurality of convex hull feature points 22210 along the convex hull 22200. Relative distances between consecutive convex hull feature points 22210 are determined along the convex hull 22200.

One or more sets of convex hull feature points 22210 may further be determined, a variation of the relative distances between consecutive convex hull feature points 22210 amongst each set being below a pre-determined threshold. As such, each set defines a corresponding high-convexity portion of the convex hull 22200.

For each set of convex hull feature points 22210 corresponding to a high-convexity portion of the convex hull 22200, an average convex hull feature point may be determined amongst the convex hull feature points 22210 of the set. The average convex hull feature point may be identified as the convex hull feature point 22210 that is the closest to a middle of the high-convexity portion corresponding to the set of portion of convex hull feature points 22210. An area of interest may be defined based on the position of the average convex hull feature point. For example, the area of interest may be a slice of the 3D point cloud comprising the average convex hull feature point and being orthogonal to a reference axis.

Additionally or alternatively, a concave hull 22300 of the projection 22000 is determined, and a convexity defect analysis is executed onto the concave hull 22300. The convexity defect analysis may be, for example and without limitation, executed by applying a function cv2.convexity Defects( )provided by the OpenCV platform, to the concave hull 22300. The convexity defect analysis provides a plurality of concave hull feature points 22310 along the concave hull 22300. Relative distances between consecutive concave hull feature points 22310 are determined along the concave hull 22300.

One or more of the concave hull feature points 22310 may further be identified as high-concavity feature points, a relative distance between the one or more high-concavity feature points and their neighboring convex hull feature points 22310 being above a pre-determined threshold, positions of the one or more concave hull feature points defining one or more corresponding areas of interest. For example, an area of interest may be a slice of the 3D point cloud comprising a corresponding high-concavity feature point and being orthogonal to a reference axis.

In this non-limiting embodiment, the projection plane 22100 may be defined by a bounding box defined around the 3D point cloud or a portion thereof. As an example, the projection plane 22100 is a side of the bounding box enclosing the 3D point cloud.

The 3D reconstructed object is sliced may be sliced in the areas of interest and along the framework or another reference axis. In some embodiment, slices (i.e. consecutive planar surfaces) are a constant distance from each other. Said distance may be be a fraction of the size of the object (e.g. 1% of the largest dimension of the 3D reference object). In some other embodiment, the number of slices can be defined by the distance between the planar surfaces calculated from the number of desired slices and the dimension of the 3D reference model. In some other embodiment, the distance between consecutive planar surfaces is defined (e.g. 0.5 cm if determination is made that the object is a human body).

FIG. 22 illustrates a slice 700 comprising a plurality of data points 70. A convex hull 710 of the data points is determined. The convex hull may further be interpolated, thereby defining a first spline curve 715. A second spline curve 720 is determined by determining a contour of the slice 70. More specifically, the second spline curve may be, for example and without limitation, an interpolation or an average of the contour of the data points 70 or an interpolation of all the data points 70 of the slice 700.

The first and second spline curves 715, 720 may further be sampled to generate a plurality of spline curve points along first and second spline curves 715, 720. For each of the spline curve points of the second spline curve 720, a vector normal to the first spline curve 715 and an intersection point of said vector with the first spline curve 715 are determined. In some embodiments, a portion of the first spline curve 715 is defined for each spline curve points of the second spline curve 720, said intersection being expected to be located in the corresponding portion. As an example, for a given spline curve points of the second spline curve 720, the corresponding portion of the first spline curve 715 is defined as the portion extending between ten spline curve points of the first spline curve 715 that are the closest to the given spline curve points of the second spline curve 720. The one or more intersections of the normal vector that are not located in the corresponding defined portion of the first spline curve 715 are discarded.

For a given spline curve points of the second spline curve 720 and its corresponding intersection point on the first spline curve 715, a hybrid spline curve point is determined based on an average of the position of the given point and the intersection point. A third spline curve 730 is further determined based on an interpolation of the hybrid spline curve points. A hybrid spline curve is thus defined as the "hybrid contour" of the slice 700.

In the same of another embodiment, the number of data points of the slice 700 is determined prior determining the first and second spline curves 715, 720. In response to said number being below a pre-determined threshold, data points of adjacent slices along the framework (e.g. from the closest slices to farthest slices) of the 3D reconstructed object are projected onto the slice 700 until a number of data points 70 reaches the pre-determined threshold.

In the same of another embodiment, a Statistical Outlier Removal (SOR) filter is applied to the data points 70 to remove outlier data points 70. The SOR filter may be defined by two filter parameters: K and σ. For a given data point 70 of the slice 700, a mean distance to the K closest data points 70 is determined. A standard deviation σ is computed for the obtained mean distance. In some embodiments, K is equal to the average number of neighbor data points 70 of each point of the slice 700.

Other approaches may be used to define the hybrid contour, such as using model-based identification trainable algorithms, generate local average points based on the data points 70, using spline-based or parametric function-based algorithms and/or any other suitable techniques.

A slice resolution may be defined as the average distance between a data points and its closest neighbor data point. Definition of the hybrid contour may be based on the resolution of the slice. For instance, if determination is made that the resolution of the slice is below a first threshold, the hybrid contour may be the convex hull 710; if determination is made that the slice resolution of the slice is higher than a second threshold, the hybrid contour may be the second spline curve 720, and if determination is made that the slice resolution of the slice is between the first and second threshold, the hybrid contour may be the hybrid spline curve 730. Additional possible definitions of the hybrid contour may be defined, such as weighted average of the convex hull 710 with the second spline curve 720 and/or other shape, each definition may be corresponding to a determined range of slice resolution.

In at least some embodiments, parameters of the SOR filter depend on the resolution of the slice. For example, parameters of the SOR filter applied to a slice having a low resolution may cause discarding of a lower number of outlying data points compared to parameters of the SOR filter applied to a slice having a higher resolution.

Figure 23:
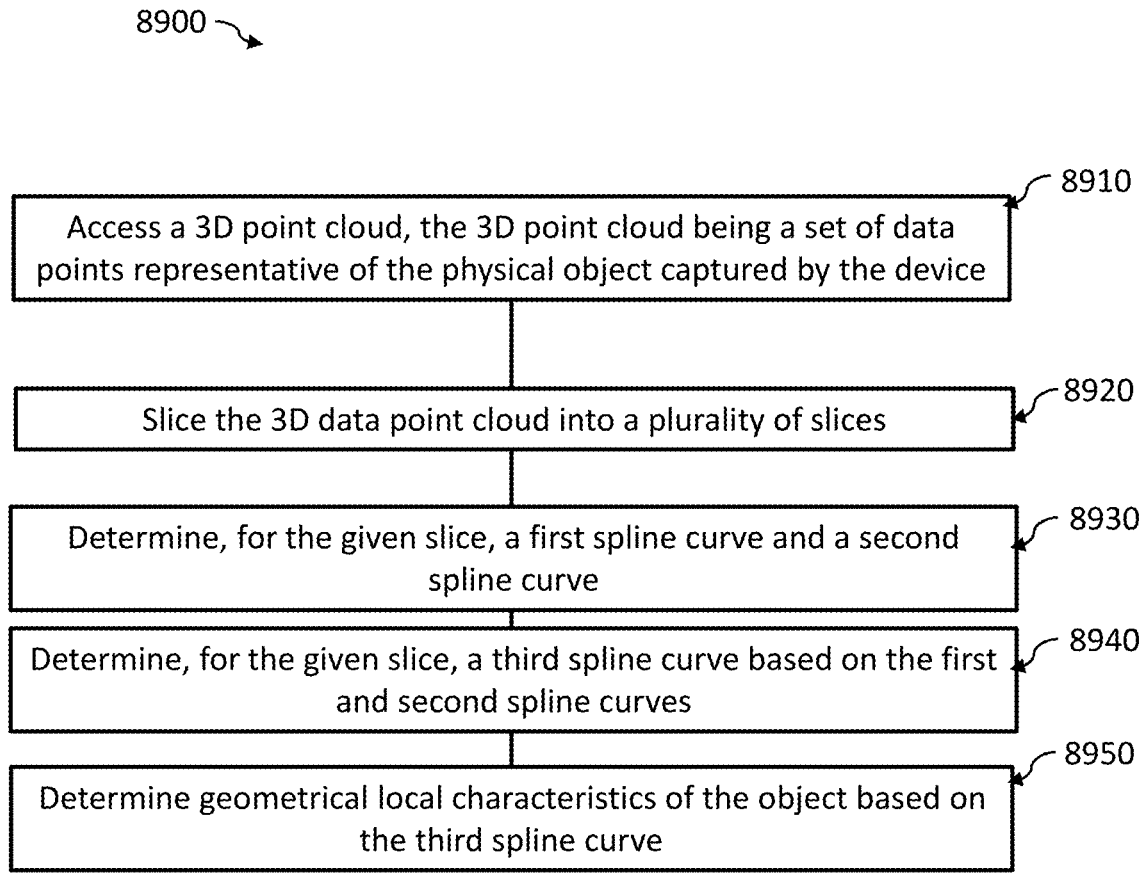
FIG. 23 illustrates a flow diagram showing operations of a method for determining a characteristic of an object in accordance with an embodiment of the present technology.

FIG. 23 is a flow diagram of a method 8900 for characterization of a 3D point cloud, such as 3D point cloud 200, the 3D point cloud being a representation of an object to be characterized, according to some embodiments of the present technology. In one or more aspects, the method 8900 or one or more steps thereof may be performed by a computer system, such as the computer system 100. The method 8900 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 8900 comprises accessing, at step 8910, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 8900 comprises slicing, at step 8920, the 3D data point cloud into a plurality of slices. The 3D point cloud may be slices along a framework thereof, or along a reference axis (e.g, a gravity axis, a main orientation of the 3D point cloud). Each slice defines a slice and comprises one or more data points. The method 8900 may further comprise, if determination that a number of data point in the slice is below a pre-determined threshold, projecting data points of adjacent slices along the framework of the 3D reconstructed object onto the slice (e.g. from the closest adjacent slices to farthest adjacent slices) until a number of data points 70 reaches the pre-determined threshold.

In the same of another embodiment, a Statistical Outlier Removal (SOR) filter is applied to the data points to remove outlier data points. The SOR filter may be defined by two filter parameters: K and σ. For a given data point of the slice, a mean distance to the K closest data points 70 is determined. A standard deviation σ is computed for the obtained mean distance. In some embodiments, K is equal to the average number of neighbor data points of each point of the slice.

The method 8900 comprises determining, at step 8930, a first spline curve and a second spline curve. The first spline curve may be an interpolation of a convex hull of the one or more data points. The second spline curve may be an interpolation of a contour of the slice. As an example, the second spline curve may be an interpolation of a concave hull of the data points, or an interpolation of the data points of the slice.

The method 8900 comprises determining, at step 8940, a third spline curve based on the first and second spline curves. As an example, the first and second spline curves may be sampled to generate spline curve points therealong, the spline curve points being uniformly distributed along the first and second spline curves. A normal vector may be generated at each spline curve points of the first spline curve, the normal vector being orthogonal to the first spline curve. For each spline curve point, an intersection of the normal vector with the second spline curve is determined and thus defines a corresponding intersection point. A hybrid spline curve point may be determined between each spline curve point of the first spline curve and the corresponding intersection point. In this embodiment, the third spline curve is an interpolation of the hybrid spline curve points.

The method 8900 comprises determining, at step 8950, geometrical local characteristics of the object based on the third spline curve. In this embodiment, a perimeter of the third spline curve is determined to measure a perimeter of the 3D reconstructed object (i.e. of the object to be characterized) at a position of the slice.

Figure 24A:
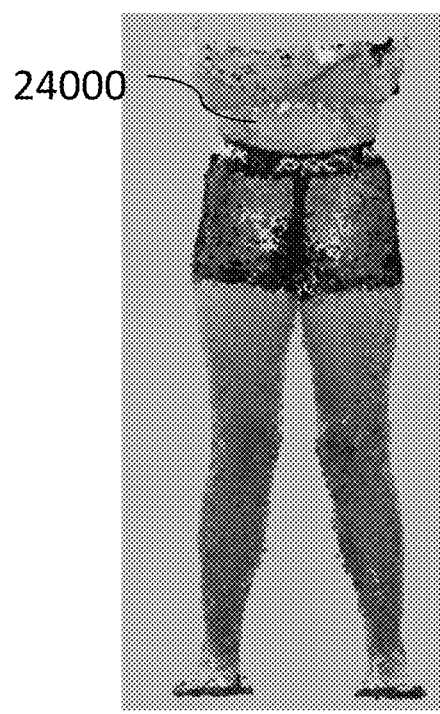
FIGS. 24A and 24B respectively illustrates a 3D point cloud and a density map thereof in accordance with an embodiment of the present technology.
Figure 24B:
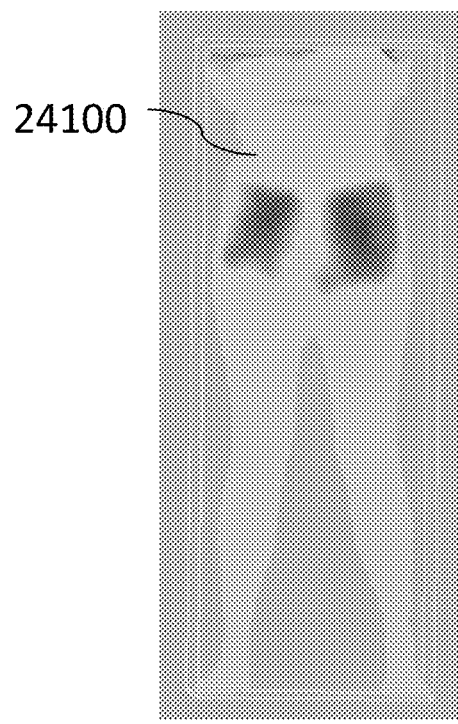

In another broad aspect, the present technology provides methods for assessing a quality of a 3D point cloud. With reference to FIG. 24A, a 3D point cloud 2400 is depicted. In this embodiment, local density of the 3D point cloud is determined and a point cloud resolution map 24100 may be generated, as shown in FIG. 24B. More specifically, the 3D point cloud 2400 may be meshed, thereby generating a meshed surface, each data points of the 3D point cloud 2400 having thus a set of one or more neighboring data points along the meshed surface. An average distance between each data point and its corresponding neighboring data points is determined and is further associated with the data point. A local density at a given data point may further be determined based on the average distance corresponding to the given data point. The point cloud resolution map 24100 may thus correspond to a rendering of the 3D point cloud with a plotting of the local densities of the data points.

In this embodiment, data points having a corresponding local density higher than a first pre-determined threshold are identified as high-density data points, a plurality of consecutive high-density data points along the meshed surface thereby forming a high-density area. Besides, data points having a corresponding local density lower than a second pre-determined threshold are identified as low-density data points, a plurality of consecutive low-density data points along the meshed surface thereby forming a low-density area. The first and second pre-determined threshold may be defined based, for example and without limitation on a percentage of a highest local density and a lowest local density determined in the data points of the 3D point cloud. For example, the first pre-determined threshold may be set equal to ten percent of the highest local density.

In the same or another embodiment, the meshed surface may be partitioned into a plurality of areas. For each area, an average density is determined based on the local density of the data points comprised in the given area. In alternative embodiments, the average density is a ratio of a number of data points comprised in the area over a surface of said area. Besides, areas having a corresponding average density higher than a first pre-determined threshold are identified as high-density areas. Areas having a corresponding average density than a second pre-determined threshold are identified as low-density areas. The first and second pre-determined threshold may be defined based, for example and without limitation on a percentage of a highest average density and a lowest average density determined amongst the plurality of areas. For example, the first pre-determined threshold may be set equal to ten percent of the highest average density.

A first quality parameter accounting for a quality of the 3D point cloud is determined as a ratio of a cumulated area of the low-density areas over a cumulated area of the high-density areas. Additionally, the first quality parameter may also depend, inter alia, on number of low-density areas, a number of areas, the lowest average density, the highest average density, or a combination thereof.

An indication may further be provided to an operator of the device 10, the indication comprising information that the 3D point cloud comprises one or more low-density areas and/or information about positions of low-density areas of the 3D point cloud.

Figure 25:
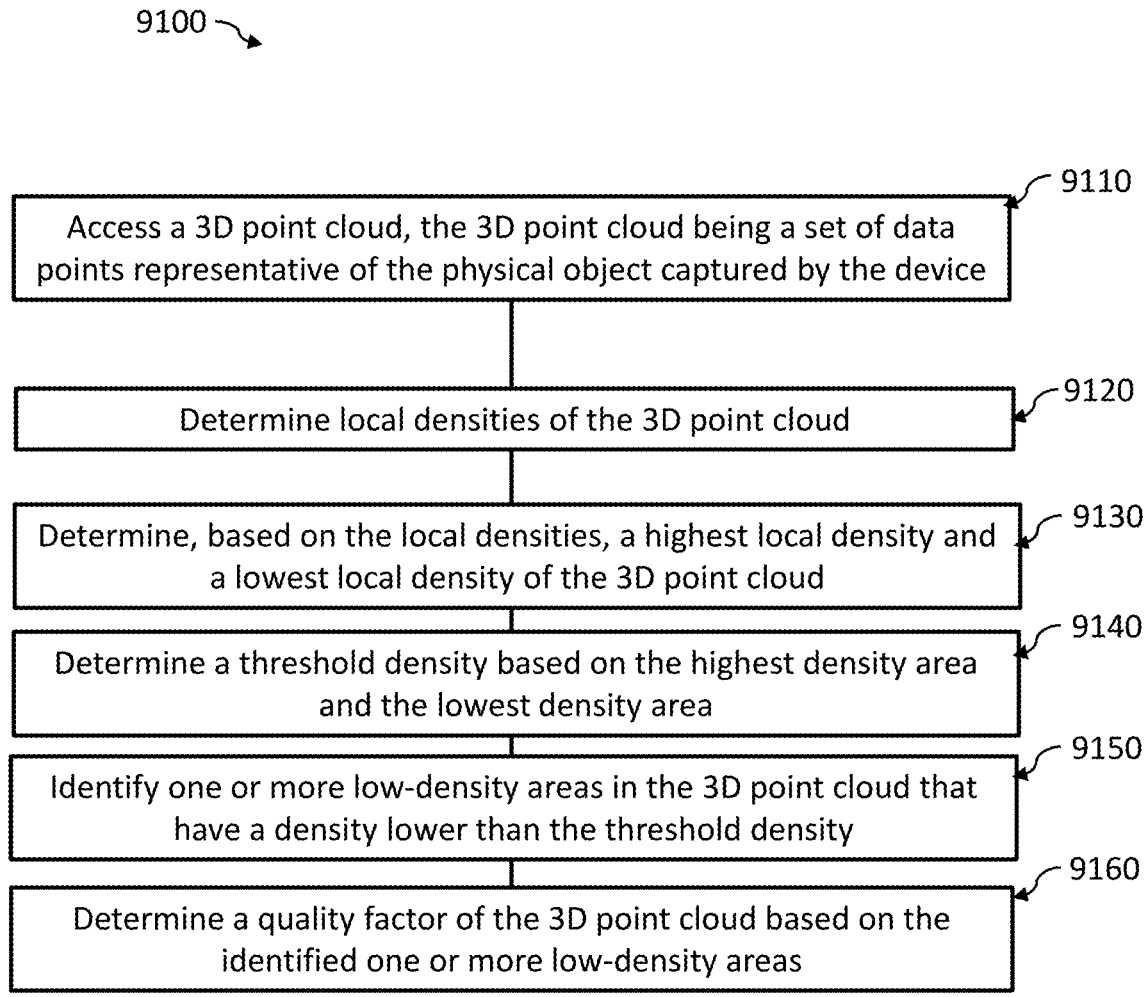
FIG. 25 illustrates a flow diagram showing operations of a method for assessing a quality of a 3D point cloud in accordance with an embodiment of the present technology.

FIG. 25 is a flow diagram of a method 9100 for assessing a quality of a 3D point cloud, such as 3D point cloud 200, the 3D point cloud being a representation of an object to be characterized, according to some embodiments of the present technology. In one or more aspects, the method 9100 or one or more steps thereof may be performed by a computer system, such as the computer system 100. The method 9100 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 9100 comprises accessing, at step 9110, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 9100 comprises determining, at step 9120, local densities of the 3D point cloud. In one embodiment, an average distance with neighboring data points may be determined for each data points. In another embodiment, a plurality of areas in the 3D point cloud are defined, and a local density of the area is determined based on a number of data points within the area for each area of the 3D point cloud.

The method 9100 comprises determining, at step 9130, based on the local densities, a highest local density and a lowest local density of the 3D point cloud.

The method 9100 comprises determining, at step 9140, a threshold density based on the highest density area and the lowest density area. The threshold may be, for example and without limitation, defined as half of a difference between the highest local density and the lowest local density or on an average thereof.

The method 9100 comprises identifying, at step 9150, one or more low-density areas in the 3D point cloud that have a density lower than the threshold density.

The method 9100 comprises determining, at step 9160, a quality factor of the 3D point cloud based on the identified one or more low-density areas. The quality factor may be, for example, determined based on a number of low-density areas, a cumulated surface thereof, a percentage of the cumulated surface low-density areas with respect to a total surface of the 3D point cloud, the highest density, or a combination thereof.

In at least some embodiments, the method 9100 further comprises providing, to an operator of a device on which the 3D point cloud is displayed and/or processed (e.g. the device 10), an indication comprising information about a location of the one or more low-density areas.

In at least some embodiments, the method 9100 further comprises determining a global surface of the low-density areas, the global surface of the low-density areas being a sum of areas of the low-density areas. To do so, a mesh of the 3D point cloud may be generate based on the data points thereof, and a surface of the mesh comprised in the low-density area may be determined for each low-density area.

Figure 26A:
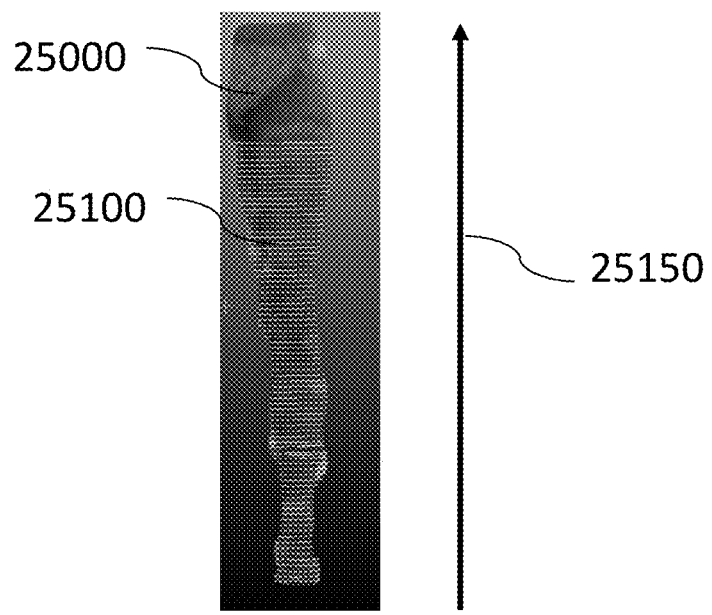
FIGS. 26A and 26B respectively illustrates a 3D point cloud sliced into a plurality of slices and a chart of an evolution of a perimeter of the slices along a reference axis of the 3D point cloud in accordance with an embodiment of the present technology.
Figure 26B:
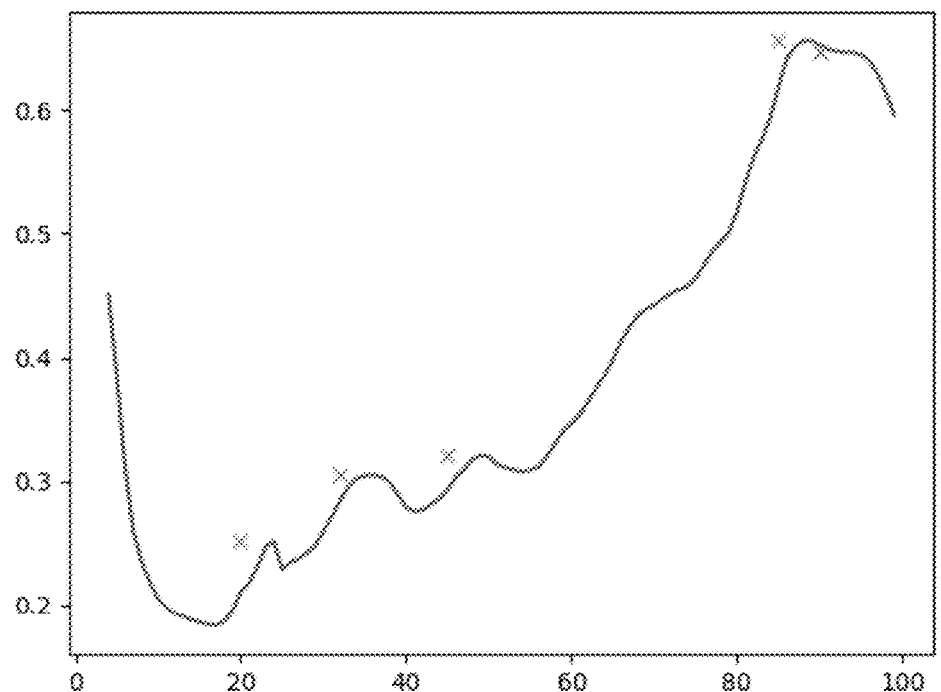

In the same of another embodiment, a second quality parameter may be generated based on characteristics of slices of the 3D point cloud. With reference to FIG. 26A, a 3D point cloud 25000 is sliced in a plurality of slices 25100 along a reference axis 25150. The reference axis is a gravity axis but may be defined differently in alternative embodiments (e.g, a portion of the framework of the 3D point cloud). The perimeter of each slice 25100 is determined and FIG. 26B is a chart of an evolution of the perimeters of the slices 25100 along the reference axis 25150. Abscises of the chart of FIG. 26B are indexes of the slices along the reference axis 25150, and ordinates of said chart are perimeters of the slices 25100. The perimeter of a given slice 25100 may be determined, for example, by executing the methods 8900. In this embodiment, if determination is made that the variation of the perimeters from a first slice 25100 of a set of consecutive slices 25100 to a second slice 25100 of the set of consecutive slices 25100 along the preferred axis 25150 is above a given threshold, identifying the set of slices 25100 as a poor-quality area of the 3D point cloud. The set may have a pre-determined number of consecutive slices 25100.

In the same or another embodiment, a first derivative and/or a second derivative of the variation of perimeter are computed. Poor-quality areas may thus be identified where the first and/or the second derivative are above a given threshold. The second quality parameter is determined based on a number of poor-quality areas and may be weighted with values of the first and/or second derivatives of the variation of perimeter of the slices 25100 in said poor-quality areas.

An indication may further be provided to an operator of the device 10, the indication comprising information that the 3D point cloud comprises one or more poor-quality areas and/or information about positions of poor-quality areas of the 3D point cloud.

Figure 27:
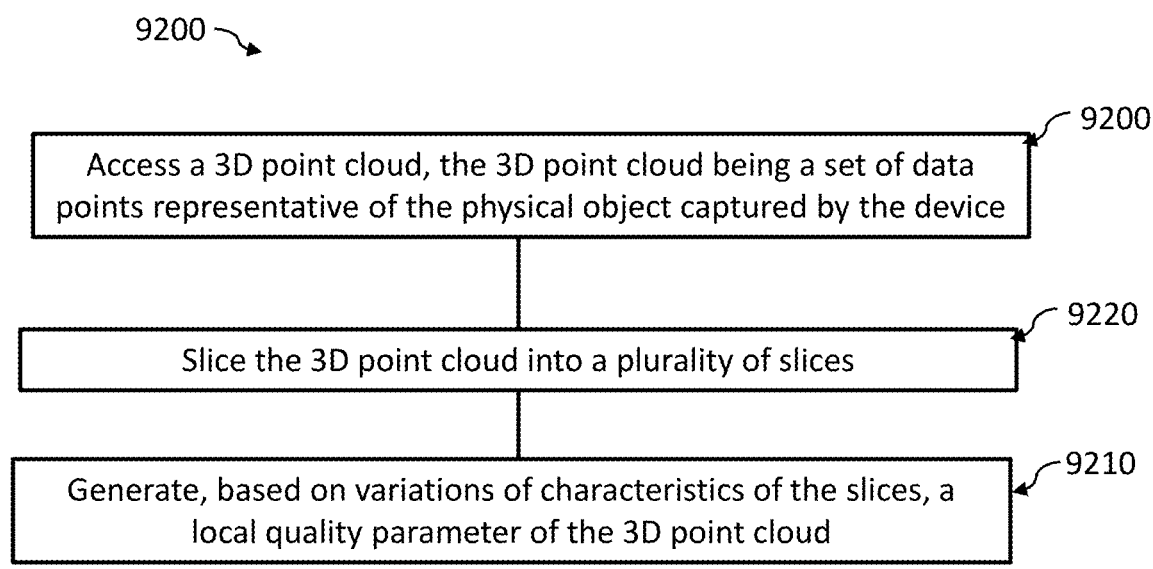
FIG. 27 illustrates a flow diagram showing operations of another method for assessing a quality of a 3D point cloud in accordance with an embodiment of the present technology.

FIG. 27 is a flow diagram of a method 9200 for characterization of a 3D point cloud, such as 3D point cloud 200, the 3D point cloud being a representation of an object to be characterized, according to some embodiments of the present technology. In one or more aspects, the method 9200 or one or more steps thereof may be performed by a computer system, such as the computer system 100. The method 9200 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 9200 comprises accessing, at step 9210, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 9200 comprises slicing the 3D point cloud into a plurality of slices.

The method 9200 comprises, at step 9300, generating, based on variations of characteristics of the slices, a local quality parameter of the 3D point cloud. In this embodiment, the method 9200 may comprise determining, for each slice of the plurality of slices, a perimeter of the slice. Said perimeter may be determined by executing steps of the method 8900 to each slice. Variations of the perimeters of the plurality of slices along a reference axis are further determined. The reference axis may be, for example, a framework of the 3D point cloud or the gravity axis. If determination is made that the variation of the perimeters from a first slice of a set of consecutive slices to a second slice of the set of consecutive slices along the preferred axis is above a pre-determined threshold, the set of slices is identified as a poor-quality area of the 3D point cloud.

The method 9200 may also comprise, prior to determining a perimeter of the slice, reorienting the 3D point cloud along the reference axis.

In at least some embodiments, a digital framework of the 3D point cloud is determined and a reference axis a reference axis is determined based on the digital framework. Slicing the 3D point cloud into a plurality is made along the reference axis.

In one embodiment, a first quality parameter may be determined based on the method 9100 applied to a given 3D point cloud, and a second quality parameter may be determined based on the method 9200 applied to the given 3D point cloud. The first and second quality parameters are further combined (e.g. determining a ratio of the second quality parameter over the first quality parameter) to assess a quality of the given 3D point cloud.

Figure 28:
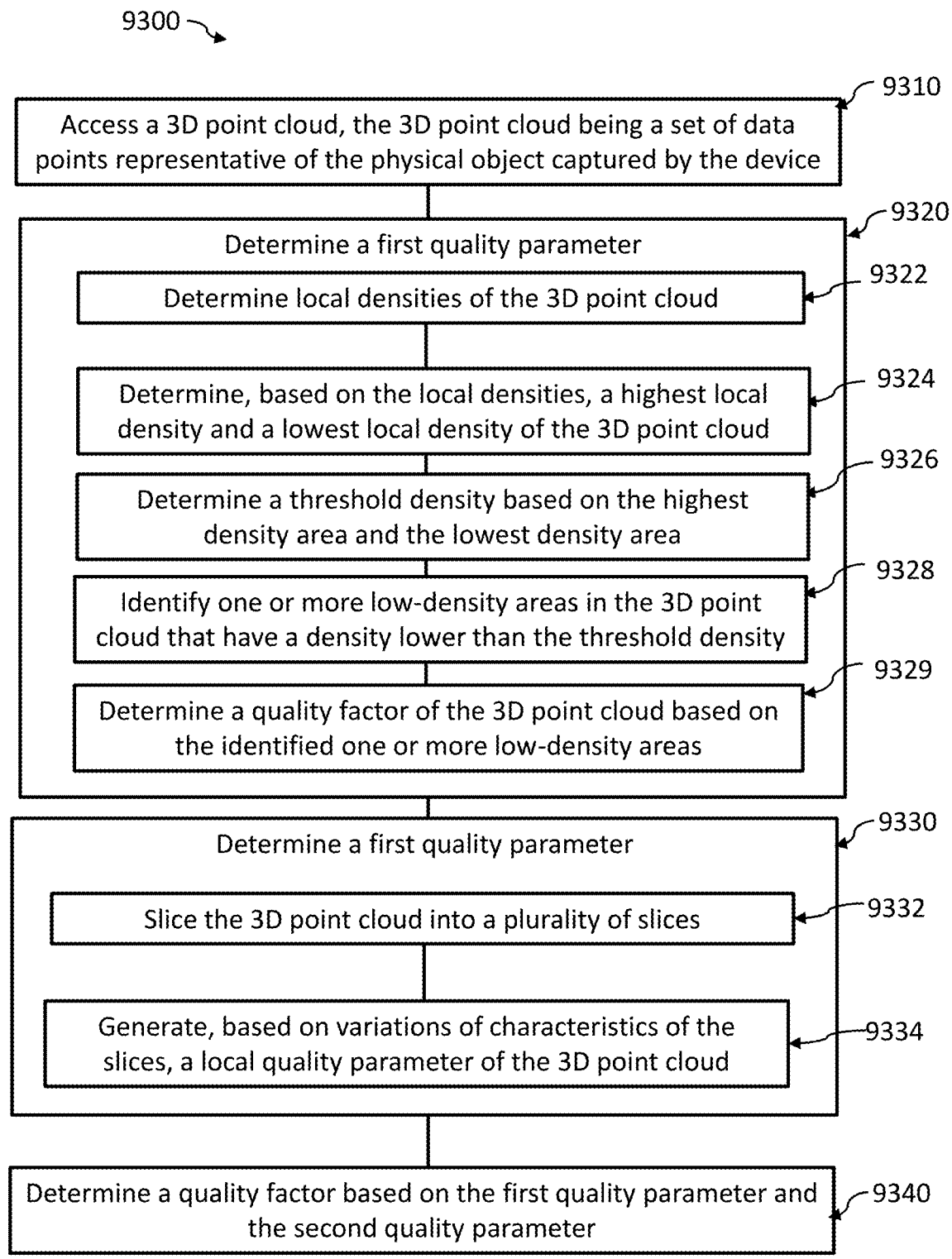
FIG. 28 illustrates a flow diagram showing operations of yet another method for assessing a quality of a 3D point cloud in accordance with an embodiment of the present technology.

FIG. 28 is a flow diagram of a method 9300 for assessing a quality of a 3D point cloud, such as 3D point cloud 200, the 3D point cloud being a representation of an object to be characterized, according to some embodiments of the present technology. In one or more aspects, the method 9300 or one or more steps thereof may be performed by a computer system, such as the computer system 100. The method 9300 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 9300 comprises accessing, at step 9310, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 9300 comprises determining, at step 9320, a first quality parameter. To do so, the method 9300 comprises determining, at sub-step 9322, local densities of the 3D point cloud. In one embodiment, an average distance with neighboring data points may be determined for each data points. In another embodiment, a plurality of areas in the 3D point cloud are defined, and a local density of the area is determined based on a number of data points within the area for each area of the 3D point cloud.

The method 9300 comprises determining, at sub-step 9324, based on the local densities, a highest local density and a lowest local density of the 3D point cloud.

The method 9300 comprises determining, at sub-step 9326, a threshold density based on the highest density area and the lowest density area. The threshold may be, for example and without limitation, defined as half of a difference between the highest local density and the lowest local density or on an average thereof.

The method 9300 comprises identifying, at sub-step 9328, one or more low-density areas in the 3D point cloud that have a density lower than the threshold density.

The method 9300 comprises determining, at sub-step 9329, the first quality parameter of the 3D point cloud based on the identified one or more low-density areas. The first quality parameter may be, for example, determined based on a number of low-density areas, a cumulated surface thereof, a percentage of the cumulated surface low-density areas with respect to a total surface of the 3D point cloud, the highest density, or a combination thereof.

In at least some embodiments, the method 9300 further comprises providing, to an operator of a device on which the 3D point cloud is displayed and/or processed (e.g. the device 10), an indication comprising information about a location of the one or more low-density areas.

In at least some embodiments, the method 9300 further comprises determining, at step 9320, a global surface of the low-density areas, the global surface of the low-density areas being a sum of areas of the low-density areas. To do so, a mesh of the 3D point cloud may be generate based on the data points thereof, and a surface of the mesh comprised in the low-density area may be determined for each low-density area.

The method 9300 comprises determining, at step 9330, a second quality parameter. To do so, the method 9300 comprises slicing, at sub-step 9332, the 3D point cloud into a plurality of slices.

The method 9300 comprises, at sub-step 9334, generating, based on variations of characteristics of the slices, a local quality parameter of the 3D point cloud. In this embodiment, the method 9200 may comprise determining, for each slice of the plurality of slices, a perimeter of the slice. Said perimeter may be determined by executing steps of the method 8900 to each slice. Variations of the perimeters of the plurality of slices along a reference axis are further determined. The reference axis may be, for example, a framework of the 3D point cloud or the gravity axis. If determination is made that the variation of the perimeters from a first slice of a set of consecutive slices to a second slice of the set of consecutive slices along the preferred axis is above a pre-determined threshold, the set of slices is identified as a poor-quality area of the 3D point cloud.

The method 9300 may also comprise, prior to determining a perimeter of the slice, reorienting the 3D point cloud along the reference axis.

In at least some embodiments, a digital framework of the 3D point cloud is determined and a reference axis a reference axis is determined based on the digital framework. Slicing the 3D point cloud into a plurality is made along the reference axis.

The method 9300 comprises determining, at step 9340, a quality factor based on the first and second quality parameters. In this embodiment, the quality factor based on a ratio of the first quality parameter over the second quality parameter. Other definitions of the quality factor based on the first and second quality parameters (e.g, a weighted average thereof) are contemplated in alternative embodiments.

Figure 29:
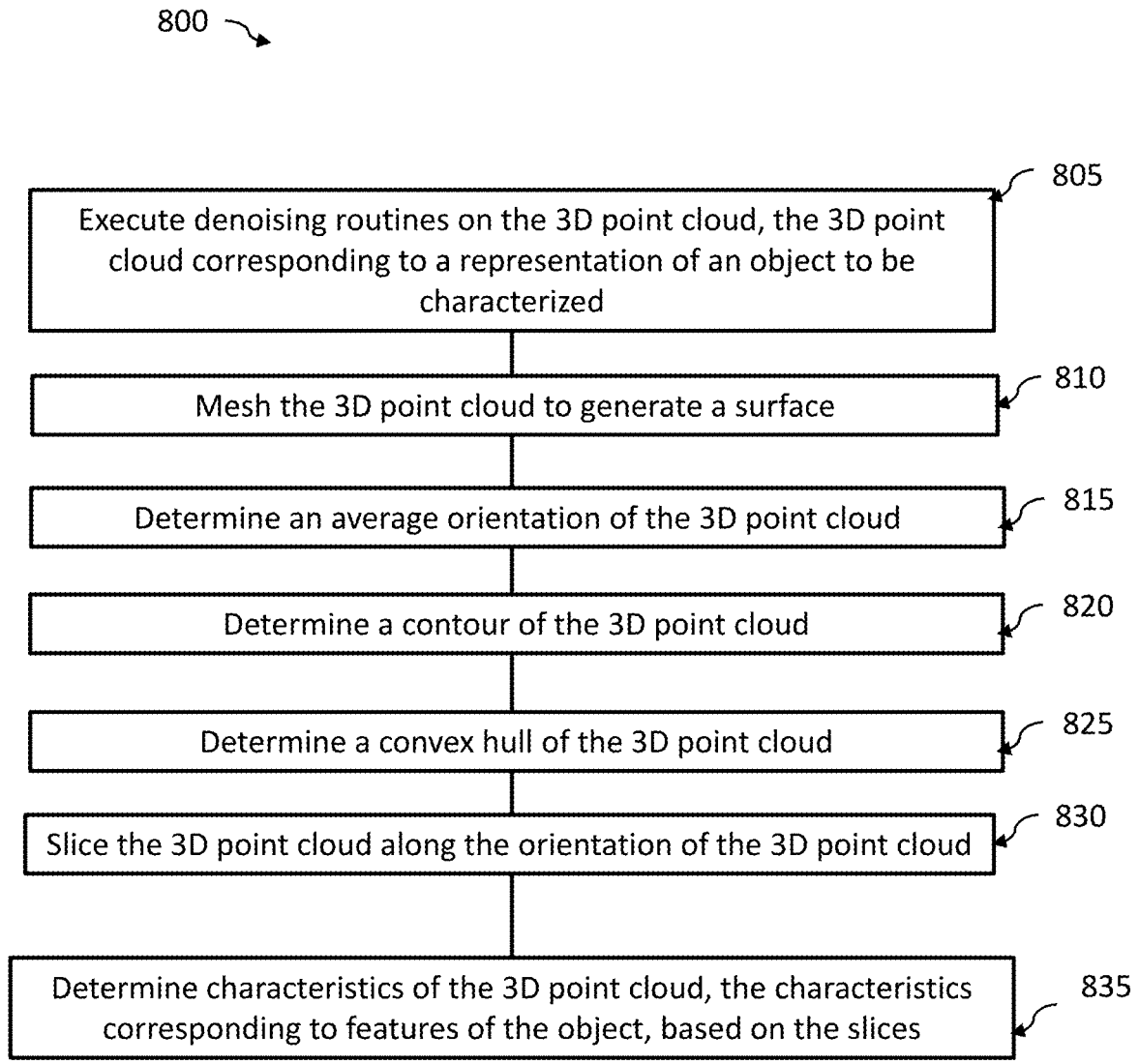
FIG. 29 illustrates a flow diagram showing operations of a method for characterizing a 3D point cloud in accordance with an embodiment of the present technology.

FIG. 29 is a flow diagram of a method 800 for characterization of a 3D point cloud, such as 3D point cloud 200, the 3D point cloud being a representation of an object to be characterized, according to some embodiments of the present technology. In one or more aspects, the method 800 or one or more steps thereof may be performed by a computer system, such as the computer system 100. The method 800 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 805, the computer system 100 may execute denoising routines on the 3D point cloud 200 to remove points, such as points 30, belonging to a background of the object to be characterized and/or lowering an amount of noise and outliers. Such routines may comprise local surface fitting, local and/or non-local averaging, statistical assumptions about the underlying noise model and/or any other suitable routines to allow the computer system 100 to remove points 30 that does not correspond to the object to be characterized.

At step 810, the 3D point cloud 200 may be meshed to generate a surface comprising points that correspond to the object to be characterized. The computer system 100 may execute known meshing techniques such as Dirichlet triangulation meshing, Delaunay triangulation meshing, or any other suitable techniques for generating said surface.

At step 815, an average line, or "skeleton" such as average line 310, of the 3D point cloud 200 may be determined. The surface generated at step 810 may be iteratively smoothed and contracted into an approximate zero-volume degenerate mesh to generate the average line 310 that abstracts the outer shape of the object.

At step 820, a contour of the 3D point cloud 200 may be determined, such as contour 510. The contour 510 of the 3D point cloud 200 may correspond to a contour of a projection of the 3D point cloud 200 on a projection plane. The projection plane may comprise the average line 310 or a portion of the average line 310. Determination of the contour 510 may be based on a concave hull of the projection, model-based algorithms, outer-shape detection algorithms and/or any other suitable techniques.

At step 825, a convex hull, such as convex hull 520, of the 3D point cloud 200 may be determined. The convex hull 520 may be determined on the projection of the 3D point cloud 200. The convex hull 520 may be a convex hull of the contour 510 determined at step 815 and comprise a plurality of convex hull feature points, such as convex hull feature points 522 belonging to the contour 510. The convex hull 520 may define a plurality of segments, each segment being defined by two consecutive convex hull feature points 522, such as segments 524. Therefore, each segment 524 may correspond to a portion of the contour 510 located between the two convex hull feature points 522 defining said segment 524. Points of a portion of the contour 510 may be characterized based on a corresponding orthogonal distance to the corresponding segment 524. For each portion of the contour 510, a point maximizing said distance may be identified as a valley feature point, such as valley feature points 526. Valley feature points 526 and/or convex hull feature points 522 may be used to identify areas of the 3D point cloud, such as search area 530.

Steps 820 and 825 may be performed on a plurality of distinct projection planes prior performing subsequent steps. Output values such as location of feature points, or location of areas of step 815 and 820 for each of the projection planes may be stored in a memory and/or, for instance, averaged prior being used in subsequent steps.

At step 830, the 3D point cloud may be sliced along the orientation of the object to be characterized. The slices may have a predetermined width and/or may be located in a search area, such as search area 530. The slices may be defined by a corresponding plane intersecting orthogonally to the average orientation determined at step 815.

At step 835, the slices may be processed by the computer system 100 to determine features of the 3D point cloud and to characterize the object 20. The computer system 100 may, for instance and without being limitative, execute a 2D projection of the points of each slice on the corresponding plane and/or determine a contour, such as average contour 730, of each slice and find a minimal or maximal length of the contours. The slice having the contour that corresponds to the minimal or maximal length respectively may be further identified by the computer system 100.

Figure 30:
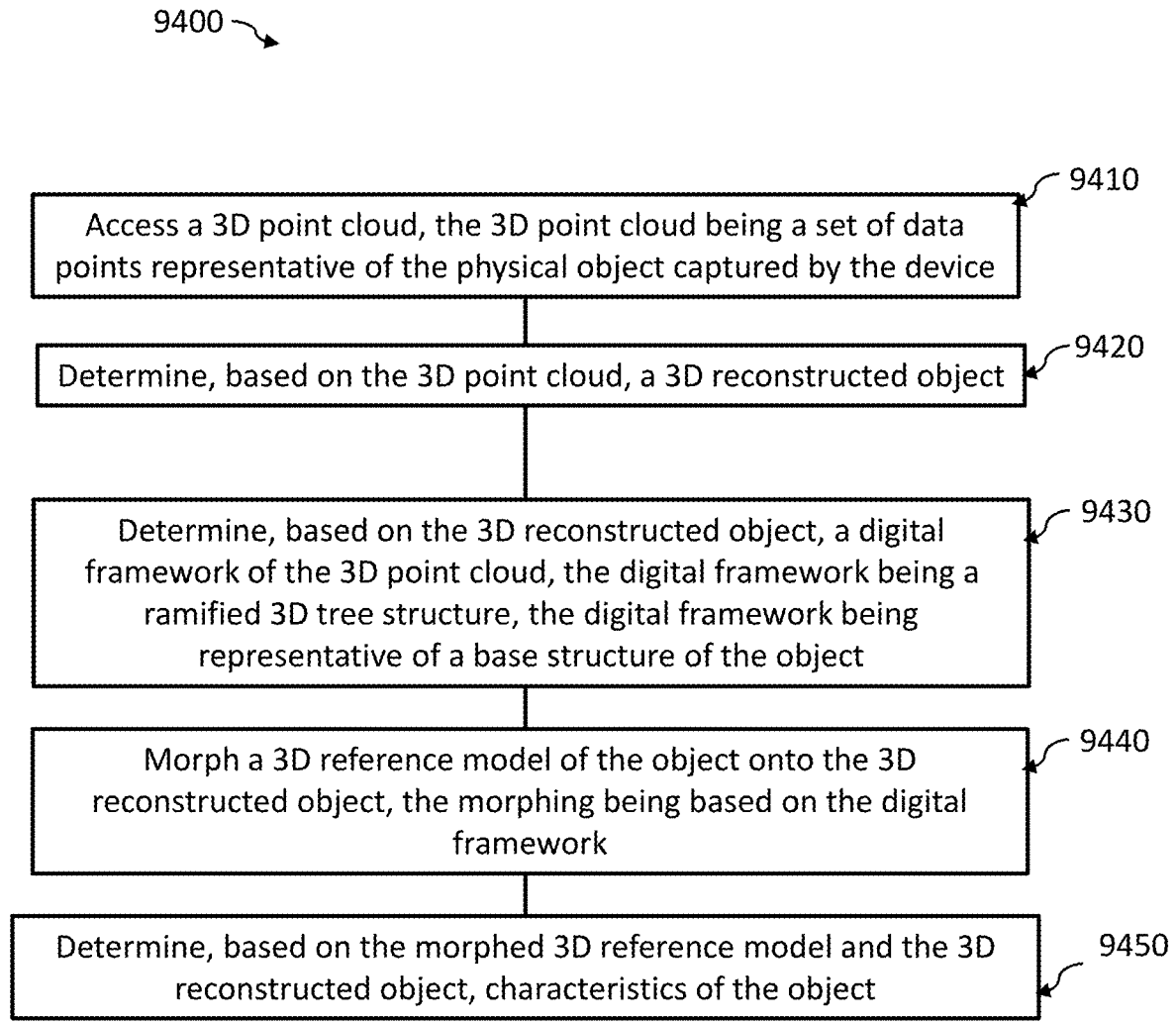
FIG. 30 illustrates a flow diagram showing operations of another method for characterizing a 3D point cloud in accordance with an embodiment of the present technology.

FIG. 30 is a flow diagram of a method 9400 for characterization of a 3D point cloud, the 3D point cloud being a representation of an object to be characterized, according to some embodiments of the present technology. In one or more aspects, the method 9400 or one or more steps thereof may be performed by a computer system, such as the computer system 100. The method 9400 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 9400 comprises accessing, at step 9410, a 3D point cloud, the 3D point cloud being a set of data points representative of the object to be characterized. Said device may be for example the device 10 of FIG. 1. In this embodiment, accessing the 3D point cloud may comprise retrieving coordinates of data points thereof from the RAM 130 and/or from the external computing device 23.

The method 9400 comprises determining, at step 9420, a 3D reconstructed object based on the 3D point cloud. In this embodiment, the 3D reconstructed object is a meshed surface formed by the data points of the 3D point cloud. The meshed surface may be generated using known meshing techniques such as Dirichlet triangulation meshing, Delaunay triangulation meshing, or any other suitable techniques for generating the 3D reconstructed object.

The method 9400 comprises determining, at step 9430, a digital framework of the 3D point cloud, the digital framework being a ramified 3D tree structure, the digital framework being representative of a base structure of the object. In this embodiment, one or more joints of the object are determined to determine the digital framework.

To do so, the method 9400 comprises, in some embodiments, determining, based on a machine learning algorithm, a first framework of the 3D point cloud, the first framework being a first ramified 3D tree structure and defining a first base structure of the object, the first framework comprising a first set of joints, meshing the 3D point cloud, thereby generating a meshed surface, determining, based on the meshed surface, a second framework of the 3D point cloud, the second framework defining a second base structure of the object, the second framework comprising a second set of joints, and aligning the first framework onto the second framework to generate the digital framework.

As an example, determining the second framework of the 3D point cloud may comprise executing a mesh contraction routine on the mesh until a volume of the mesh is below a first pre-determined threshold, the mesh contraction routine outputting a second ramified 3D tree structure, and determining the second set of joints based on the second ramified 3D tree structure.

In some embodiments, determining the second set of joints may comprisepartitioning the second ramified 3D tree structure in at least one continuous portion, and, if determination is made that, in a given continuous portion of the second ramified 3D tree structure, a local radius of curvature at a given point of the second framework is lower that a second threshold, a point of the continuous portion having a lowest radius of curvature is determined and marked as a joint of the second set of joints.

In some embodiments, a length of the at least one continuous portion of the second ramified 3D tree structure is pre-determined.

In some embodiments, the second threshold is determined by determining a maximal distance between two data points of the 3D point cloud and setting the second threshold as a given percentage of the maximal distance.

In some embodiments, determining the second set of joints may comprise generating a plurality of feature points on the second ramified 3D tree structure, determining a number of neighboring feature points for each feature points, and identifying one or more feature points as joints of the second set of joints in response to determining that the one or more features points have more than two neighboring feature points.

In some embodiments, if determination is made that a plurality of consecutive feature points have more than two neighboring feature points, the method 9400 may comprise determining an average feature point based on the plurality of consecutive feature points, and identifying the average feature point as a joint of the second set of points.

In some embodiments, determining, based on a machine learning algorithm, a first framework of the 3D point cloud may comprise generating, according to a pre-determined set of parameters, at least one 2D virtual image of the 3D point cloud, executing a machine learning algorithm on the at least one 2D virtual image, the machine learning algorithm outputting 2D projected joints of the object on the at least one 2D virtual image, and projecting, based on the pre-determined set of parameters, the 2D projected joints onto the 3D point cloud, thereby defining 3D projected joints that established the first set of points.

In some embodiments, the method 9400 may further comprise determining, for a given 3D projected joint, a slice of the 3D point cloud comprising the 3D projected joint, and determining a position of the joint within the slice of the 3D point cloud.

In some embodiments of the method 9400, determining a position of the joint within the 3D point cloud is made based on an average position of the positions of data points of the 3D point cloud comprised in the slice.

In some embodiments, the 2D projected joints are interconnected by 2D projected structural segments and are tagged with information about interconnections of the 2D projected joints, the method further comprising defining a digital framework of the 3D point cloud based on the joints and the tags of the 2D projected joints, the digital framework comprising the joints, and structural segments extending between the joints.

The method 9400 comprises morphing, at step 9440, a 3D reference model of the object onto the 3D reconstructed object, the morphing being based on the digital framework. In at least some embodiments, the 3D reference model comprises one or more landmarks such that, upon morphing the 3D reference model of the object onto the 3D reconstructed object, the one or more landmarks provide indication of a corresponding one or more areas of interest of the 3D point cloud, the characteristics of the object being determined in the one or more areas of interest.

In at least some embodiments, the one or more areas of interest are determined, or refined, by projecting the 3D point cloud on a projection plane, determining a contour of the projection of the 3D point cloud, determining a convex hull of the projection, thereby determining a plurality of convex hull feature points, consecutive convex hull feature points being interconnected by a segment of the convex hull and determining, based on relative distances between consecutive convex hull feature points, sub-areas of interest.

The method 9400 comprises determining, at step 9450, characteristics of the object based on the morphed 3D reference model and the 3D reconstructed object. In this embodiment, the 3D point cloud. In some embodiments, the 3D reconstructed object is sliced in the one or more areas of interest and characteristics of the 3D point cloud are determined based on the slices.

To do so, the 3D point cloud or a portion thereof is, in some embodiments, projected the 3D point cloud on a projection plane (e.g, a side of a bounding box of the 3D point cloud). A Statistical Outlier Removal (SOR) filter may be applied on the projected data points. The method 9400 may comprise, if determination is made that a number of data points comprised in a given slice is below a second threshold, generating additional data points, the additional data points being projection of data points of adjacent slices onto the given slice. More specifically, data points of neighboring closest slices may iteratively be projected onto the given slice until a number of data points in the given slice reaches the second threshold.

A hull of the projection of the 3D point cloud is determined and a convexity defects analysis is applied thereon, thereby determining a plurality of hull feature points. Areas of interest may be further determined and/or refined, based on relative distances between consecutive hull feature points. As an example, the hull may be a convex hull, the convexity defects analysis causing determination of a plurality of convex hull feature points. As such, relative distances between consecutive convex hull feature points may be determined along the convex hull. One or more sets of convex hull feature points may be identified, a variation of the relative distances between consecutive convex hull feature points amongst each set being below a pre-determined threshold, and, for each of the one or more set, a position of an average convex hull feature point amongst the convex hull feature points of the set may be identified, the position of the average convex hull feature point defining an area of interest.

As another example, the hull may be a concave hull, the convexity defects analysis causing determination of a plurality of concave hull feature points. As such, relative distances between consecutive concave hull feature points along the concave hull may be determined. One or more concave hull feature points may be identified, a relative distance between the one or more concave hull feature points and their neighboring convex hull feature points being above a pre-determined threshold, positions of the one or more concave hull feature points defining one or more corresponding areas of interest.

In some embodiments, a first spline curve and a second spline curve may be determined. The first spline curve may be an interpolation of a convex hull of the one or more data points. The second spline curve may be an interpolation of a contour of the slice. As an example, the second spline curve may be an interpolation of a concave hull of the data points, or an interpolation of the data points of the slice.

A third spline curve based on the first and second spline curves may further be determined. As an example, the first and second spline curves may be sampled to generate spline curve points therealong, the spline curve points being uniformly distributed along the first and second spline curves. A normal vector may be generated at each spline curve points of the first spline curve, the normal vector being orthogonal to the first spline curve. For each spline curve point, an intersection of the normal vector with the second spline curve is determined and thus defines a corresponding intersection point. A hybrid spline curve point may be determined between each spline curve point of the first spline curve and the corresponding intersection point. In this embodiment, the third spline curve is an interpolation of the hybrid spline curve points. In this embodiment, a perimeter of the third spline curve is determined to measure a perimeter of the 3D reconstructed object (i.e. of the object to be characterized) at a position of the slice.

In some embodiments, the method 9400 further comprises assessing a quality of the 3D point cloud. To do so, the method 9400 may comprise determining a first quality parameter, a determination of the first quality parameter comprising determining local densities of the 3D point cloud, determining, based on the local densities, a highest local density and a lowest local density of the 3D point cloud, determining, based on a density of the highest density area and a density of the lowest density area, a threshold density, and identifying one or more low-density areas in the 3D point cloud that have a density lower than the threshold density, the first quality parameter being defined by a ratio of a surface of the one or more low-density areas on a surface of the 3D point cloud. The method 9400 may further comprise determining a second quality parameter, a determination of the second quality parameter comprising slicing the 3D point cloud into a plurality of slices, generating, based on variations of characteristics of the slices, local quality parameters of the 3D point cloud, and identifying one or more poor-quality areas in the 3D point cloud that have a local quality parameter lower than a pre-determined threshold, the second quality parameter being defined by an average of local quality parameters. A quality factor may further be determined based on the first quality parameter and the second quality parameter.

In some embodiments, the quality factor is based on a ratio of the first quality parameter over the second quality parameter.

In some embodiments, determining local densities of the 3D point cloud comprises determining, for each data points, an average distance with neighboring data points.

In some embodiments, determining local densities of the 3D point cloud comprises defining a plurality of areas in the 3D point cloud, for each area of the 3D point cloud, determining a local density of the area based on a number of data points within the area.

In some embodiments, an indication comprising information about a location of the one or more low-density areas may be provided to an operator of a device on which the 3D point cloud is displayed.

In some embodiments, the quality factor is determined based on a number of low-density areas, a number of areas, the lowest density, the highest density, or a combination thereof.

In some embodiments, the method 9400 may comprise determining a global surface of the low-density areas, the global surface of the low-density areas being a sum of areas of the low-density areas. The global surface of the low-density areas may be the accumulated surface of the one or more low-density areas on a mesh of the 3D point cloud based on the plurality of data points.

In some embodiments, generating one of the local quality parameter of the 3D point cloud comprises determining, for each slice of the plurality of slices, a perimeter of the slice, determining variations of the perimeters of the plurality of slices along a reference axis, and if determination is made that the variation of the perimeters from a first slice of a set of consecutive slices to a second slice of the set of consecutive slices along the preferred axis is above a pre-determined threshold, identifying the set of slices as a poor-quality area of the 3D point cloud.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method for determining joints of an object, the method comprising:
   accessing a 3D point cloud, the 3D point cloud being a set of data points representative of the object;
   determining a digital framework of the 3D point cloud, the digital framework being a ramified 3D tree structure;
   determining a first set of joints of the object based on ramifications of the digital framework, the determining the first set of joints comprising:
      generating a plurality of feature points on the digital framework,
      determining a number of directly connected neighboring feature points for each feature point of the plurality of feature points, and
      identifying one or more feature points of the plurality of feature points as the first set of joints in response to determining that the one or more feature points each have more than two directly connected neighboring feature points; and
   determining a second set of joints of the object, the determining the second set of joints comprising:
      identifying local radiuses of curvature for each feature point of the digital framework, and
      identifying the second set of joints based on a comparison of the local radiuses of curvature with a threshold.

2. The method of claim 1, wherein determining the first set of joints further comprises, after determining that a plurality of consecutive feature points have more than two directly connected neighboring feature points:
   determining an average feature point based on the plurality of consecutive feature points; and
   identifying the average feature point as a joint.

3. The method of claim 1, wherein determining the digital framework of the 3D point cloud comprises:
   meshing the 3D point cloud, thereby generating a mesh; and
   executing a mesh contraction routine on the mesh until a volume of the mesh is below a pre-determined threshold.

4. The method of claim 1, wherein the object is a human body or a portion thereof.

5. The method of claim 1, wherein determining the second set of joints comprises:
   partitioning the digital framework in at least one continuous portion;
   determining a continuous portion of the digital framework where the local radius of curvature at a point of the continuous portion is lower than the threshold;
   determining a point of the continuous portion having a lowest radius of curvature; and
   storing an indication that the point is a joint of the object.

6. The method of claim 5, wherein a length of the at least one continuous portion of the digital framework is pre-determined.

7. The method of claim 1, further comprising determining the threshold by:
   determining a maximal distance between two data points of the 3D point cloud; and
   determining the threshold based on the maximal distance.

8. The method of claim 1, further comprising:
   determining that two joints of the second set of joints have a relative distance between one another that is below a pre-determined threshold;
   determining an average joint based on the two joints; and
   replacing the two joints in the second set of joints with the average joint.

9. The method of claim 8, wherein the average joint is a barycenter of the two joints.

10. The method of claim 1, further comprising calculating measures of the first and second set of joints.

11. A computer-implemented method for determining joints of an object, the method comprising:
    accessing a 3D point cloud, the 3D point cloud being a set of data points representative of the object;
    determining a digital framework of the 3D point cloud, the digital framework being a ramified 3D tree structure; and
    determining a set of joints of the object based on ramifications of the digital framework, the determining the set of joints comprising:
       generating a plurality of feature points on the digital framework,
       determining a number of directly connected neighboring feature points for each feature point of the plurality of feature points, and
       identifying one or more feature points of the plurality of feature points as the set of joints in response to determining that the one or more feature points each have more than two directly connected neighboring feature points.

12. The method of claim 11, wherein determining the set of joints further comprises, after determining that a plurality of consecutive feature points have more than two directly connected neighboring feature points:
    determining an average feature point based on the plurality of consecutive feature points; and
    identifying the average feature point as a joint.

13. The method of claim 11, wherein determining the digital framework of the 3D point cloud comprises:
    meshing the 3D point cloud, thereby generating a mesh; and
    executing a mesh contraction routine on the mesh until a volume of the mesh is below a pre-determined threshold.

14. The method of claim 11, wherein the object is a human body or a portion thereof.

15. A system comprising at least one processor and memory storing executable instructions, which, upon being executed by the at least one processor, cause the system to:
    access a 3D point cloud, the 3D point cloud being a set of data points representative of an object;
    determine a digital framework of the 3D point cloud, the digital framework being a ramified 3D tree structure; and
    determine a set of joints of the object, the determining the set of joints comprising:
       identifying local radiuses of curvature of feature points of the digital framework, and
       identifying the set of joints based on a comparison of the local radiuses of curvature with a threshold.

16. The system of claim 15, wherein the instructions that cause the system to determine the digital framework of the 3D point cloud comprise instructions that cause the system to:

mesh the 3D point cloud, thereby generating a mesh; and
execute a mesh contraction routine on the mesh until a volume of the mesh is below a pre-determined threshold.

17. The system of claim 15, wherein the object is a human body or a portion thereof.

18. The system of claim 15, wherein the instructions that cause the system to determine the set of joints comprise instructions that cause the system to:
partition the digital framework in at least one continuous portion;
determine a continuous portion of the digital framework where the local radius of curvature at a point of the continuous portion is lower than the threshold;
determine a point of the continuous portion having a lowest radius of curvature; and
store an indication that the point is a joint of the object.

19. The system of claim 15, wherein the instructions further cause the system to determine the threshold by:
determining a maximal distance between two data points of the 3D point cloud; and
determining the threshold based on the maximal distance.

20. The system of claim 15, wherein the instructions further cause the system to:
determine that two joints of the set of joints have a relative distance between one another that is below a pre-determined threshold;
determine an average joint based on the two joints, wherein the average joint is a barycenter of the two joints; and
replace the two joints in the set of joints with the average joint.

* * * * *